US008001355B2

(12) United States Patent
Inomata et al.

(10) Patent No.: US 8,001,355 B2
(45) Date of Patent: Aug. 16, 2011

(54) STORAGE SYSTEM, VOLUME ALLOCATION METHOD AND MANAGEMENT APPARATUS

(75) Inventors: Hirofumi Inomata, Tokyo (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 607 days.

(21) Appl. No.: 12/153,114

(22) Filed: May 14, 2008

(65) Prior Publication Data

US 2009/0240910 A1 Sep. 24, 2009

(30) Foreign Application Priority Data

Mar. 21, 2008 (JP) .................................. 2008-073971

(51) Int. Cl.
G06F 12/00 (2006.01)
(52) U.S. Cl. ....................................... 711/171; 711/173
(58) Field of Classification Search .................. 711/171, 711/173
See application file for complete search history.

(56) References Cited

U.S. PATENT DOCUMENTS

| 2003/0195942 | A1* | 10/2003 | Muhlestein et al. | 709/215 |
| 2006/0236056 | A1* | 10/2006 | Nagata | 711/165 |
| 2006/0242377 | A1* | 10/2006 | Kanie et al. | 711/165 |
| 2008/0104216 | A1* | 5/2008 | Ponnappan et al. | 709/223 |
| 2008/0195624 | A1* | 8/2008 | Ponnappan et al. | 707/9 |

FOREIGN PATENT DOCUMENTS

JP 10-320126 12/1998

* cited by examiner

Primary Examiner — Hashem Farrokh
(74) Attorney, Agent, or Firm — Stites & Harbison PLLC; Juan Carlos A. Marquez, Esq.

(57) ABSTRACT

This storage system includes a virtual storage selection unit for selecting a virtual storage unit to be allocated to a virtual server unit according to a virtual storage search policy table for searching the virtual storage unit based on a parameter input by a user when a command is issued for allocating the volume to the virtual server unit, a volume selection unit for selecting the type of volume to be allocated to the virtual storage unit allocated to the virtual server unit with the virtual storage allocation unit according to a volume type search policy table for searching the type of volume based on the parameter, and a volume allocation unit for creating the volume selected with the volume selection unit based on the parameter and allocating the created volume to the virtual storage unit allocated to the virtual server unit with the virtual storage allocation unit.

9 Claims, 23 Drawing Sheets

FIG.7

| PHYSICAL STORAGE IDENTIFYING INFORMATION | VIRTUAL STORAGE IDENTIFYING INFORMATION | CONTROLLER BAND (Gbps) | DISK CACHE CAPACITY (MB) | ALLOCATED PHYSICAL DISK CAPACITY (GB) | ... |
|---|---|---|---|---|---|
| 700 | 500 | 4 | 256 | 300 | ... |
| 700 | 510 | 2 | 128 | 200 | ... |
| 710 | 520 | | | | |
| ... | | | | | |

| VIRTUAL HBA WWN (WWN OF SOURCE) | PHYSICAL STORAGE IDENTIFYING INFORMATION | VIRTUAL STORAGE IDENTIFYING INFORMATION | VOLUME IDENTIFYING INFORMATION | VIRTUAL CAPACITY (GB) | USED PHYSICAL CAPACITY (GB) | VOLUME ATTRIBUTE | USAGE |
|---|---|---|---|---|---|---|---|
| AAAA | 700 | 500 | 222 | 50 | 10 | HDP | BOOT |
| AAAA | 700 | 500 | 356 | 150 | 150 | NON-HDP | OTHER |
| BBBB | 700 | 500 | 555 | 100 | 100 | NON-HDP | OTHER |
| CCCC | 700 | 500 | 687 | 150 | 30 | HDP | BOOT |
| DDDD | 700 | 510 | 123 | 100 | 50 | HDP | POSTSCRIPT DB |
| EEEE | 710 | 520 | 215 | 2 | 2 | NON-HDP | SWAP PARTITION |
| FFFF | 710 | 520 | 216 | 2 | 1 | HDP | SWAP FILE |
| ... | | | | | | | |

FIG.9

| CONDITION NAME | SEARCH CONDITION |
|---|---|
| VIRTUAL STORAGE CONNECTED FROM VIRTUAL HBA | CONDITIONAL STATEMENT 1 |
| VIRTUAL STORAGE CONNECTED FROM VIRTUAL SERVER | CONDITIONAL STATEMENT 2 |
| VIRTUAL STORAGE CONNECTED FROM PHYSICAL HBA | CONDITIONAL STATEMENT 3 |
| VIRTUAL STORAGE CONNECTED FROM PHYSICAL SERVER | CONDITIONAL STATEMENT 4 |
| VIRTUAL STORAGE CONNECTED TO SERVER GROUP | CONDITIONAL STATEMENT 5 |
| ... | |

```
(EXAMPLE OF CONDITIONAL STATEMENT 2)

SELECT  TA. 'VIRTUAL SERVER IDENTIFYING INFORMATION'
        TB. 'VIRTUAL HBA WWN'
        TB. 'PHYSICAL HBA WWN'
        TC. 'PHYSICAL STORAGE IDENTIFYING INFORMATION'
        TC. 'VIRTUAL STORAGE IDENTIFYING INFORMATION'

FROM TA, TB, TC
WHERE
        TA. 'VIRTUAL SERVER IDENTIFYING INFORMATION' =
        TB. 'VIRTUAL SERVER IDENTIFYING INFORMATION' AND
        TB. 'VIRTUAL HBA WWN' = TC. 'VIRTUAL HBA WWN'
```

| CONDITION NAME | SEARCH CONDITION | RECOMMENDED VOLUME ATTRIBUTE |
|---|---|---|
| BOOT | CONDITIONAL STATEMENT 6 (E.G.: USAGE IS BOOT) | CAPACITY VIRTUALIZATION (HDP) |
| FORM DB | CONDITIONAL STATEMENT 7 | NON-HDP |
| POSTSCRIPT DB | CONDITIONAL STATEMENT 8 | HDP |
| SWAP PARTITION | CONDITIONAL STATEMENT 9 | NON-HDP |
| SWAP FILE | CONDITIONAL STATEMENT 10 | HDP |
| DYNAMIC PARTITION | CONDITIONAL STATEMENT 11 | HDP |
| ... | | |

(EXAMPLE OF CONDITIONAL STATEMENT 6)

SELECT TA. USAGE
   FROM TA
    WHERE TA. USAGE = 'BOOT'

FIG.13

| PHYSICAL SERVER IDENTIFYING INFORMATION | PHYSICAL HBA WWN |
|---|---|
| 10 | XXXX |
| 10 | YYYY |
| 15 | ZZZZ |
| ... | |

| VIRTUAL SERVER IDENTIFYING INFORMATION | PHYSICAL SERVER IDENTIFYING INFORMATION |
|---|---|
| 100 | 10 |
| 120 | 10 |
| 130 | 15 |
| ... | |

| VIRTUAL SERVER IDENTIFYING INFORMATION | VIRTUAL HBA WWN | PHYSICAL HBA WWN |
|---|---|---|
| 100 | AAAA | XXXX |
| 100 | BBBB | XXXX |
| 120 | CCCC | XXXX |
| 120 | DDDD | YYYY |
| ... | | |

| VIRTUAL SERVER IDENTIFYING INFORMATION | SERVICE RATE (%) | CPU QUANTITY | MEMORY CAPACITY (MB) |
|---|---|---|---|
| 100 | 50 | 2 | 512 |
| 120 | 50 | 2 | 384 |
| ... | | | |

| SERVER IDENTIFYING INFORMATION | ATTRIBUTE |
|---|---|
| 10 | PHYSICAL SERVER |
| 15 | PHYSICAL SERVER |
| 100 | VIRTUAL SERVER |
| 120 | VIRTUAL SERVER |
| 130 | VIRTUAL SERVER |
| ... | |

| SERVER IDENTIFYING INFORMATION ||
|---|---|
| PHYSICAL SERVER IDENTIFYING INFORMATION | VIRTUAL SERVER IDENTIFYING INFORMATION<br><br>(HOWEVER, WHEN IDENTIFYING A PHYSICAL SERVER, THIS IS SET TO A SPECIFIC VALUE (E.G.: -1)) |

| SERVER IDENTIFYING INFORMATION | VIRTUAL HBA WWN | PHYSICAL STORAGE IDENTIFYING INFORMATION | VIRTUAL STORAGE IDENTIFYING INFORMATION | USAGE | CAPACITY | VOLUME ATTRIBUTE |
|---|---|---|---|---|---|---|
| 120 | -BLANK- | -BLANK- | -BLANK- | BOOT | 100 | -BLANK- |
| ... | | | | | | |
| 111A | 111B | 111C | 111D | 111E | 111F | 111G |

| VIRTUAL SERVER IDENTIFYING INFORMATION | RECORDS SEARCHED ON VIRTUAL SERVER IDENTIFYING INFORMATION | | | 112 |
|---|---|---|---|---|
| | VIRTUAL HBA WWN | PHYSICAL HBA WWN | PHYSICAL STORAGE IDENTIFYING INFORMATION | VIRTUAL STORAGE IDENTIFYING INFORMATION |
| 120 | CCCC | XXXX | 700 | 500 |
| 120 | DDDD | YYYY | 700 | 510 |
| ... | | | | |
| 112A | 112B | 112C | 112D | 112E |

FIG.22

| PHYSICAL STORAGE IDENTIFYING INFORMATION | VIRTUAL STORAGE IDENTIFYING INFORMATION | STATISTICS BASED ON VIRTUAL STORAGE IDENTIFYING INFORMATION (VIRTUAL STORAGE SUMMARY) | | | | | | | |
|---|---|---|---|---|---|---|---|---|---|
| | | CONTROLLER BAND (Gbps) | DISK CACHE CAPACITY (MB) | VIRTUAL SERVER QUANTITY | ACCUMULATION OF (SERVICE RATE*CPU QUANTITY) | VOLUME COUNT | VIRTUAL CAPACITY | USED PHYSICAL CAPACITY | ALLOCATED PHYSICAL DISK CAPACITY |
| 700 | 500 | 4 | 256 | 2 | 2 | 4 | 450 | 90 | 300 |
| 700 | 510 | 2 | 128 | 1 | 1 | 1 | 100 | 50 | 200 |
| ... | | | | | | | | | |
| 113A | 113B | 113C | 113D | 113E | 113F | 113G | 113H | 113I | 113J |

| PHYSICAL STORAGE IDENTIFYING INFORMATION | VIRTUAL STORAGE IDENTIFYING INFORMATION | VIRTUAL HBA WWN | PHYSICAL HBA WWN | VIRTUAL STORAGE SUMMARY |
|---|---|---|---|---|
| 700 | 500 | CCCC | XXXX | ... |
| 700 | 510 | DDDD | YYYY | ... |
| ... | | | | |

| RECORDS SEARCHED ON INFORMATION INPUT FROM ADMINISTRATOR ||
|---|---|
| CONDITION NAME | RECOMMENDED VOLUME ATTRIBUTE |
| BOOT | HDP |
| ... | |

115A  115B

115

STORAGE SYSTEM, VOLUME ALLOCATION METHOD AND MANAGEMENT APPARATUS

CROSS-REFERENCES

This application relates to and claims priority from Japanese Patent Application No. 2008-073971, filed on Mar. 21, 2008, the entire disclosure of which is incorporated herein by reference.

BACKGROUND

The present invention generally relates to a storage system, a volume allocation method and a management apparatus, and can be suitably applied to a storage system that virtualizes a storage apparatus into a plurality of virtual storage apparatuses.

In recent years, server virtualization technology for virtualizing physical servers is becoming popular. The server virtualization technology is technology for realizing a physical server in a software-like program execution environment (virtual server). For instance, the server virtualization technology is realized as server virtualization software or hypervisor. As described above, nowadays, an MPU (Micro Processing Unit) of the physical server has hardware functions for realizing the server virtualization technology.

With the server virtualization technology, since a plurality of virtual servers can be operated with a single physical server, the number of physical servers to be actually used can be consequently reduced, and effects such as facilitation of hardware maintenance management and cost reduction are expected. In addition, with the server virtualization technology, when the server virtualization software creates a virtual server, it sets the capacity or ratio of the physical resource (CPU (Central Processing Unit), memory, interface, etc.) to be used by that virtual server, and creates a virtual server having the hardware specification based on this setting.

Meanwhile, storage virtualization technology is also becoming popular for the purpose of facilitating management and reducing operation costs. The storage virtualization technology includes modes that overlap with the server virtualization technology, but also includes different modes. The storage virtualization technology can be broadly classified into three modes; namely, a mode of treating a plurality of physical storage apparatuses (physical storages) as a single virtual storage apparatus, a mode of partitioning a physical resource of a single physical storage and treating such partitions as a plurality of virtual storage apparatuses (virtual storages), and a mode of allocating a physical resource that is being actually used to a plurality of virtual storages (the ensuing explanation primarily focuses on the third mode described above). When partitioning the physical resource of the physical storage, the physical resource to be partitioned includes, in addition to disk devices, a disk cache memory and a communication bandwidth of a fibre channel.

The storage virtualization technology of the third mode described above is provided based on a so-called dynamic storage area allocation function that realizes dynamic capacity expansion by dynamically allocating a storage capacity to a virtual volume. A physical resource (storage area of disk device) is allocated to a virtual volume set with this attribute only in an area that was previously accessed. Thus, hardware resources can be efficiently used in this kind of storage virtualization technology.

As this kind of dynamic storage area allocation function, technology is proposed for acquiring logical volume configuration information for each allocated logical volume, setting the other logical volumes in the same logical volume group including the allocated volume, selecting the logical volume having the lowest I/O load among the allocation candidate volume group, and removing the other logical volumes of the same volume group from the allocation target (for instance, refer to Japanese Patent Laid-Open Publication No. H10-320126).

Meanwhile, the conventional storage virtualization technology gives no consideration to the server virtualization technology, and there is a problem in that it is not compatible with virtual servers.

For example, with the server virtualization technology, there are cases where the physical resource is shared, and if a volume of the physical storage is allocated to a virtual server with the same method as allocating the volume to the physical server, there is a problem in that the physical resource will be allocated excessively.

In addition, the conventional storage virtualization technology is only able to manage a physical host bus adapter, and there is a problem in that a corresponding physical resource cannot be allocated to the configuration of the virtual server such as not being able to manage a virtual host bus adapter. Like this, with the conventional technology, there is a problem in that the operational efficiency of the storage apparatus will deteriorate.

SUMMARY

The present invention was made in view of the foregoing points. Thus, an object of the present invention is to propose a storage system, a volume allocation method and a management apparatus capable of dramatically improving the operational efficiency of a virtual server and a virtual storage.

In order to achieve the foregoing object, the present invention provides storage system comprising a server apparatus for sending and receiving data sent from a client apparatus, a storage apparatus including a volume for storing the data, and a management apparatus for managing the storage apparatus. The server apparatus comprises a plurality of virtual server units for controlling the sending and receiving of the data independently for each prescribed client apparatus. The storage apparatus comprises a plurality of virtual storage units including the volume independently for each prescribed virtual server unit for storing the data. The management apparatus comprises a virtual storage selection unit for selecting the virtual storage unit to be allocated to the virtual server unit according to a virtual storage search policy table for searching the virtual storage unit based on a parameter input by a user when a command is issued for allocating the volume to the virtual server unit, a volume selection unit for selecting the type of the volume to be allocated to the virtual storage unit allocated to the virtual server unit with the virtual storage allocation unit according to a volume type search policy table for searching the type of the volume based on the parameter, and a volume allocation unit for creating the volume selected with the volume selection unit based on the parameter and allocating the created volume to the virtual storage unit allocated to the virtual server unit with the virtual storage allocation unit.

The present invention additionally provides a volume allocation method of a storage comprising a server apparatus for sending and receiving data sent from a client apparatus, a storage apparatus including a volume for storing the data, and a management apparatus for managing the storage apparatus. The server apparatus comprises a plurality of virtual server units for controlling the sending and receiving of the data independently for each prescribed client apparatus. The storage apparatus comprises a plurality of virtual storage units including the volume independently for each prescribed virtual server unit for storing the data. The volume allocation method comprises a first step of a virtual storage selection of the management apparatus selecting the virtual storage unit to be allocated to the virtual server unit according to a virtual storage search policy table for searching the virtual storage unit based on a parameter input by a user when a command is issued for allocating the volume to the virtual server unit, a second step of a volume selection unit of the management apparatus selecting the type of the volume to be allocated to the virtual storage unit allocated to the virtual server unit with the virtual storage allocation unit according to a volume type search policy table for searching the type of the volume based on the parameter, and a third step of a volume allocation unit of the management apparatus creating the volume selected with the volume selection unit based on the parameter and allocating the created volume to the virtual storage unit allocated to the virtual server unit with the virtual storage allocation unit.

The present invention further provides a management apparatus for managing a storage apparatus including a volume for storing data sent from a client apparatus via a server apparatus. The management apparatus comprises a virtual storage selection unit for selecting a virtual storage unit as a virtualization of the storage apparatus to be allocated to a virtual server unit as a virtualization of the server apparatus according to a virtual storage search policy table for searching the virtual storage unit based on a parameter input by a user when a command is issued for allocating the volume to the virtual server unit, a volume selection unit for selecting the type of the volume to be allocated to the virtual storage unit allocated to the virtual server unit with the virtual storage allocation unit according to a volume type search policy table for searching the type of the volume based on the parameter, and a volume allocation unit for creating the volume selected with the volume selection unit based on the parameter and allocating the created volume to the virtual storage unit allocated to the virtual server unit with the virtual storage allocation unit.

Accordingly, virtual storage units and volumes can be allocated appropriately in correspondence with the configuration of the virtual server unit.

According to the present invention, it is possible to realize a storage system, a volume allocation method and a management apparatus capable of dramatically improving the operational efficiency of a virtual server and a virtual storage.

DESCRIPTION OF DRAWINGS

FIG. 7 is a conceptual diagram explaining the configuration of a virtual storage configuration information table;

FIG. 8 is a conceptual diagram explaining the configuration of a volume configuration information table;

FIG. 9 is a conceptual diagram explaining the configuration of a virtual storage search policy table;

FIG. 10 is a conceptual diagram explaining the configuration of a conditional statement for use in the virtual storage search policy table;

FIG. 11 is a conceptual diagram explaining the configuration of a volume attribute policy table;

FIG. 12 is a conceptual diagram explaining the configuration of a conditional statement for use in the volume attribute policy table;

FIG. 13 is a conceptual diagram explaining the configuration of a physical HBA (Host Bus Adaptor) repository information table;

FIG. 14 is a conceptual diagram explaining the configuration of a virtual server repository information table;

FIG. 15 is a conceptual diagram explaining the configuration of a virtual HBA configuration information table;

FIG. 16 is a conceptual diagram explaining the configuration of a virtual server configuration information table;

FIG. 17 is a conceptual diagram explaining the configuration of a server identifying information table;

FIG. 18 is a conceptual diagram explaining another configuration example of a server identifying information table;

FIG. 20 is a conceptual diagram explaining the configuration of an input parameter information table;

FIG. 21 is a conceptual diagram explaining the configuration of a virtual storage search result information table;

FIG. 22 is a conceptual diagram explaining the configuration of a virtual storage status search result information table;

FIG. 23 is a conceptual diagram explaining the configuration of a virtual storage candidate list information table;

FIG. 24 is a conceptual diagram explaining the configuration of a volume attribute search result information table;

DETAILED DESCRIPTION

An embodiment of the present invention is now explained with reference to the attached drawings. The following embodiment, however, is not intended to limit the present invention in any way.

Figure 1:
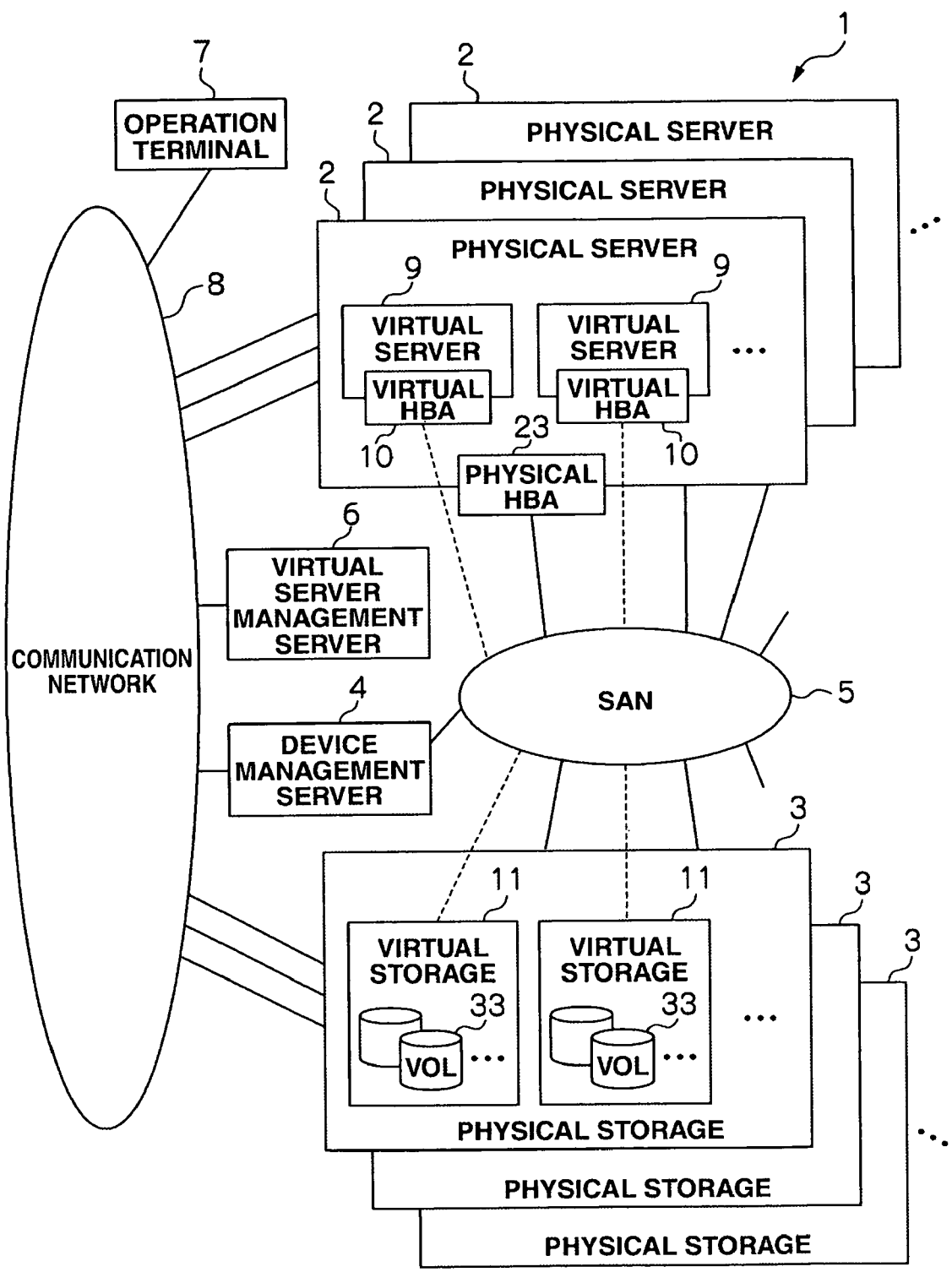
FIG. 1 is a block diagram showing the configuration of a storage system according to an embodiment of the present invention.

FIG. 1 shows an example of the configuration of a storage system 1 according to the present embodiment. The storage system 1 is configured by a physical server apparatus (physical server) 2, a physical storage apparatus (physical storage) 3 and a device management server 4 being connected via a SAN (Storage Area Network) 5. The physical server 2 is connected to the SAN 5 via a physical host bus adapter (physical HBA) 23.

The storage system 1 is also configured by the physical server 2, the device management server 4, a virtual server management server 6 and an operation terminal 7 being connected via a communication network 8 such as a LAN (Local Area Network).

A plurality of virtual servers 9 operate in the physical server 2. The virtual server 9 includes a virtual host bus adapter (virtual HBA) 10, and is connected to the SAN 5 via the virtual HBA 10. The physical storage 3 operates a plurality of virtual storages 11 by executing the program described later. The virtual storages 11 include a logical volume (VOL) 33 for storing data sent from the virtual servers 9.

Figure 2:
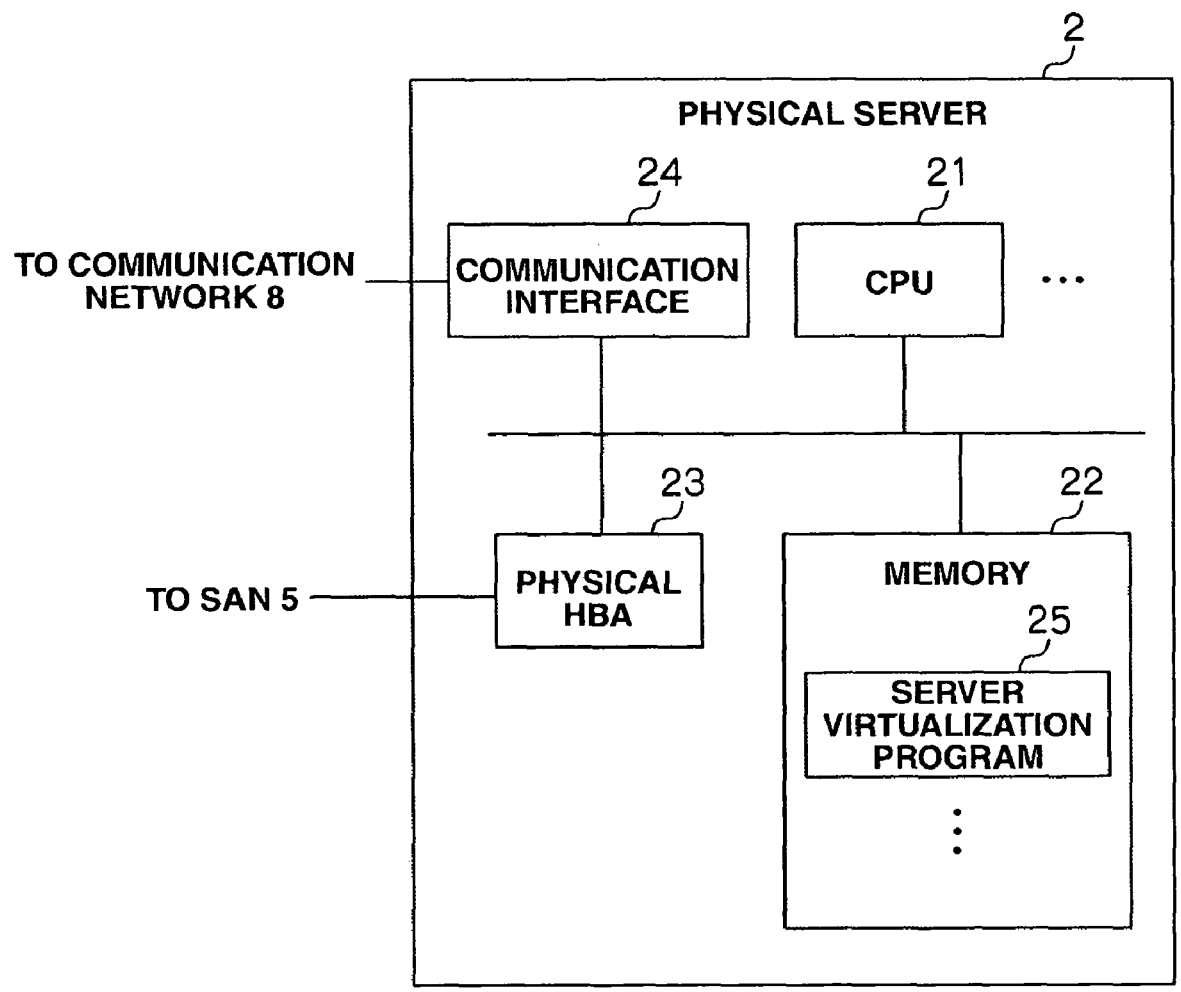
FIG. 2 is a block diagram showing the configuration of a physical server.

FIG. 2 shows an example of the configuration of the physical server 2. The physical server 2 is configured by a CPU 21, a memory 22, a physical HBA 23 and a communication interface (communication IF) 24 being connected via an internal bus or the like.

The CPU 21 controls the overall physical server 2. The memory 22 stores a server virtualization program 25. The physical HBA 23 is connected to the SAN 5, and sends and receives data sent from the client apparatus. The communication IF 24 is connected to the communication network 8, and sends and receives commands.

The CPU 21 executes the server virtualization program 25 so as to operate the plurality of virtual servers 9 and operate the virtual HBA 10 for each virtual server 9. The virtual server 9 controls the sending and receiving of data independently from each prescribed client apparatus. The virtual HBA 10 in reality sends and receives data to and from the logical volume 33 of the virtual storage 11 via the physical HBA 23.

Figure 3:
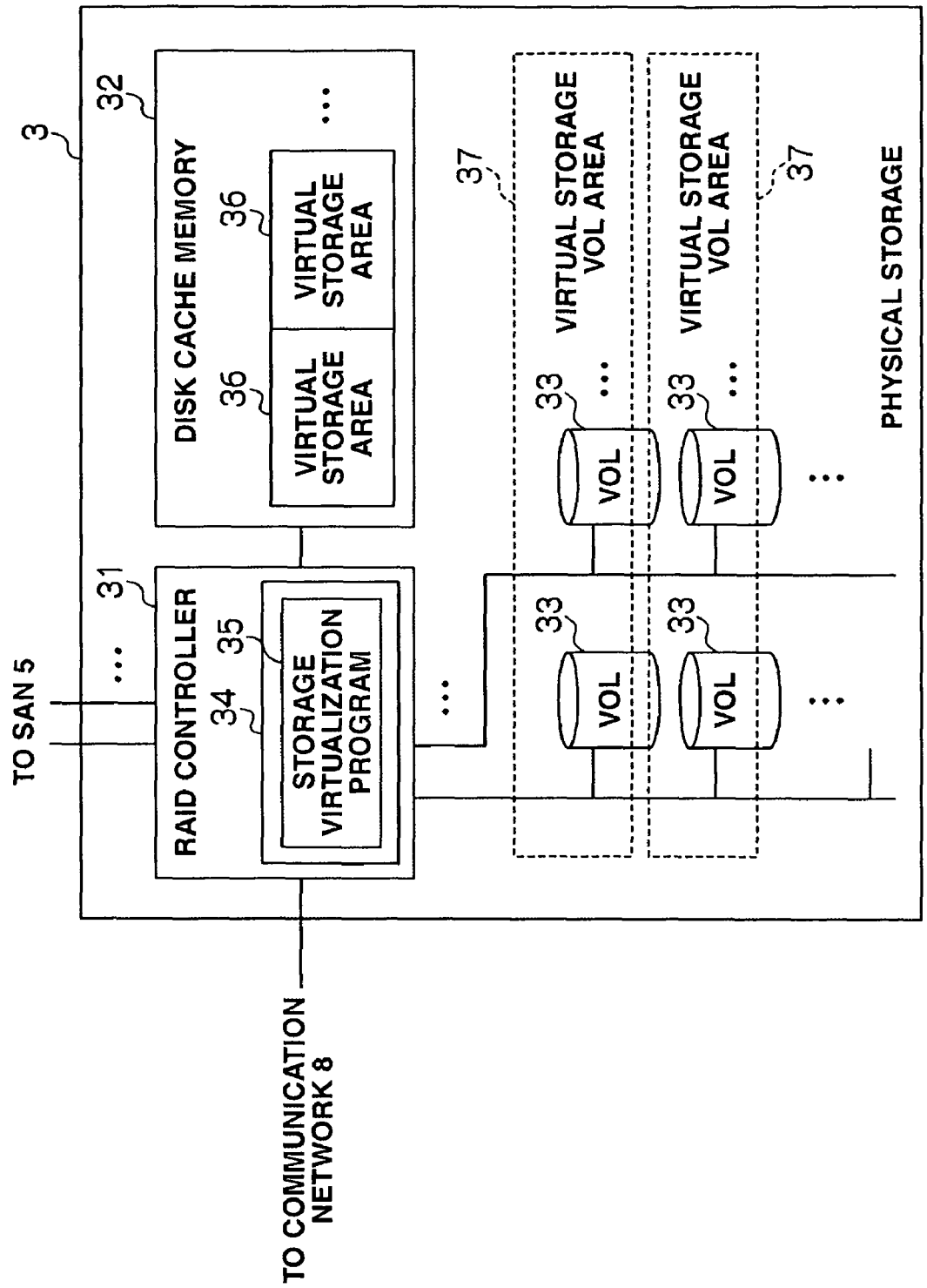
FIG. 3 is a block diagram showing the configuration of a physical storage.

FIG. 3 shows an example of the configuration of the physical storage 3. The physical storage 3 is configured by a RAID (Redundant Arrays of Independent Disks) controller 31, a disk cache memory 32, and a logical volume 33 being connected via an internal bus or the like.

The RAID controller 31 controls the overall physical storage 3. The RAID controller 31 configures a RAID group with one or more magnetic disks (not shown). When the RAID controller 31 is to configure the RAID group with a plurality of magnetic disks, such magnetic disks are configured in a RAID configuration such as RAID 1 or RAID 5. The RAID controller 31 logically partitions the RAID group into a plurality of physical volumes.

The RAID controller 31 additionally creates a dynamic storage area allocation volume for realizing dynamic capacity expansion by allocating the storage capacity of one or more physical volumes.

The RAID controller 31 includes a memory 34. The memory 34 stores a storage virtualization program 35. The RAID controller 31 executes the storage virtualization program 35 so as to operate the plurality of virtual storages 11. The virtual storage 11 provides the logical volume 33 (physical volume or dynamic storage area allocation volume) to the virtual server 9. The virtual storage 11 controls the storage of data independently for each prescribed virtual server 9.

The disk cache memory 32 includes a virtual storage area 36 to be used for each virtual storage 11, and temporarily stores data and the like of the corresponding virtual server 9. The logical volumes 33 are compiled for each virtual storage VOL area 37 to be used for each virtual storage 11, and store data of the corresponding virtual server 9.

Figure 4:
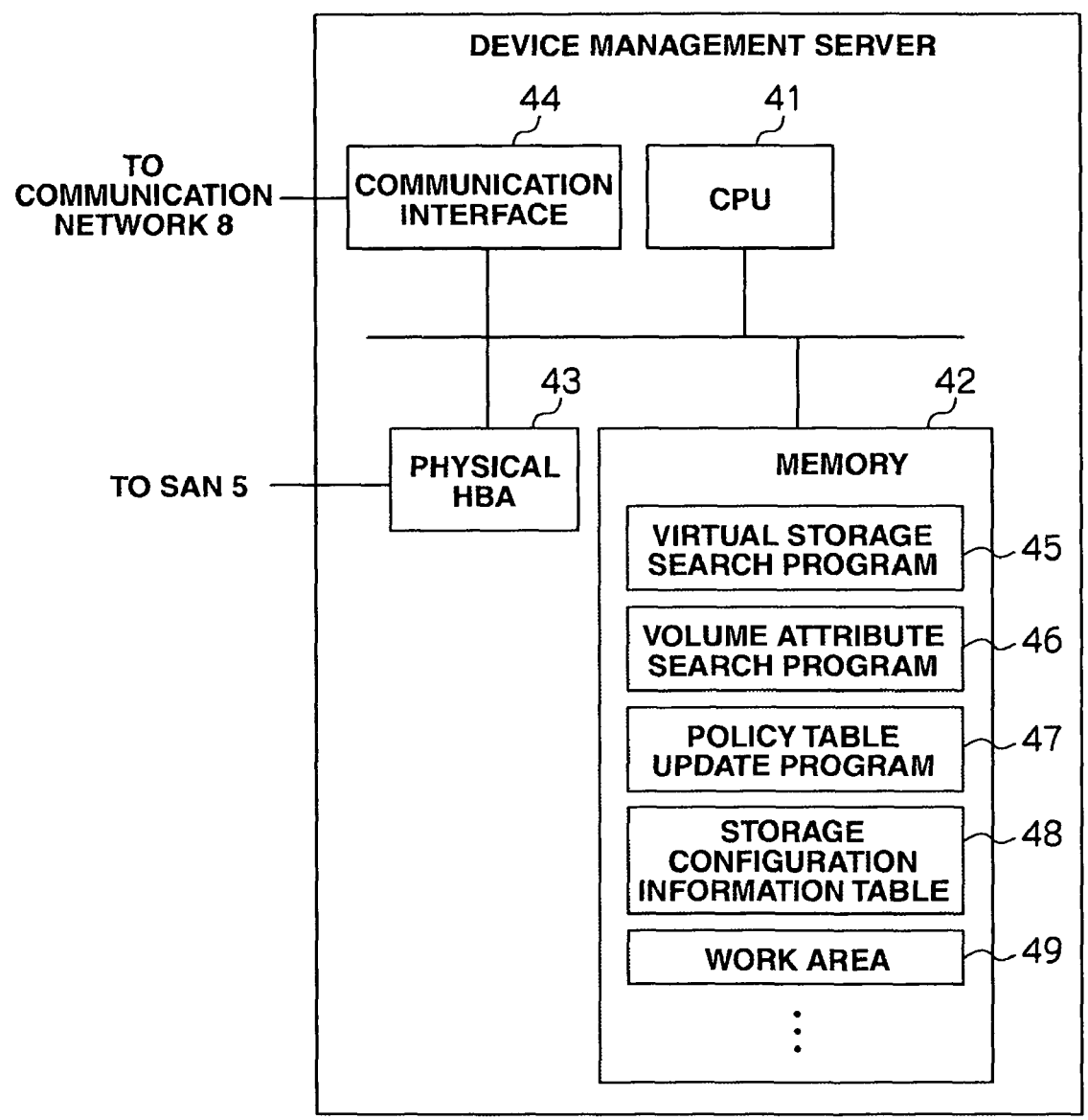
FIG. 4 is a block diagram showing the configuration of a device management server.

FIG. 4 shows an example of the configuration of the device management server 4. The device management server 4 is configured from a CPU 41, a memory 42, a physical HBA 43 and a communication interface 44 being connected via an internal bus or the like.

The CPU 41 controls the overall device management server 4. The memory 42 stores a virtual storage search program 45, a volume attribute (type) search program 46, a policy table update program 47, a storage configuration information table 48, and a work area 49. The specific processing of the virtual storage search program 45, the volume attribute search program 46 and the policy table update program 47, and the specific configuration of the storage configuration information table 48 will be described later. The storage configuration information table 48 is acquired by the CPU 41 from the physical storage 3 at each prescribed timing. The physical HBA 43 is connected to the SAN 5. The communication IF 44 is connected to the communication network 8.

Figure 5:
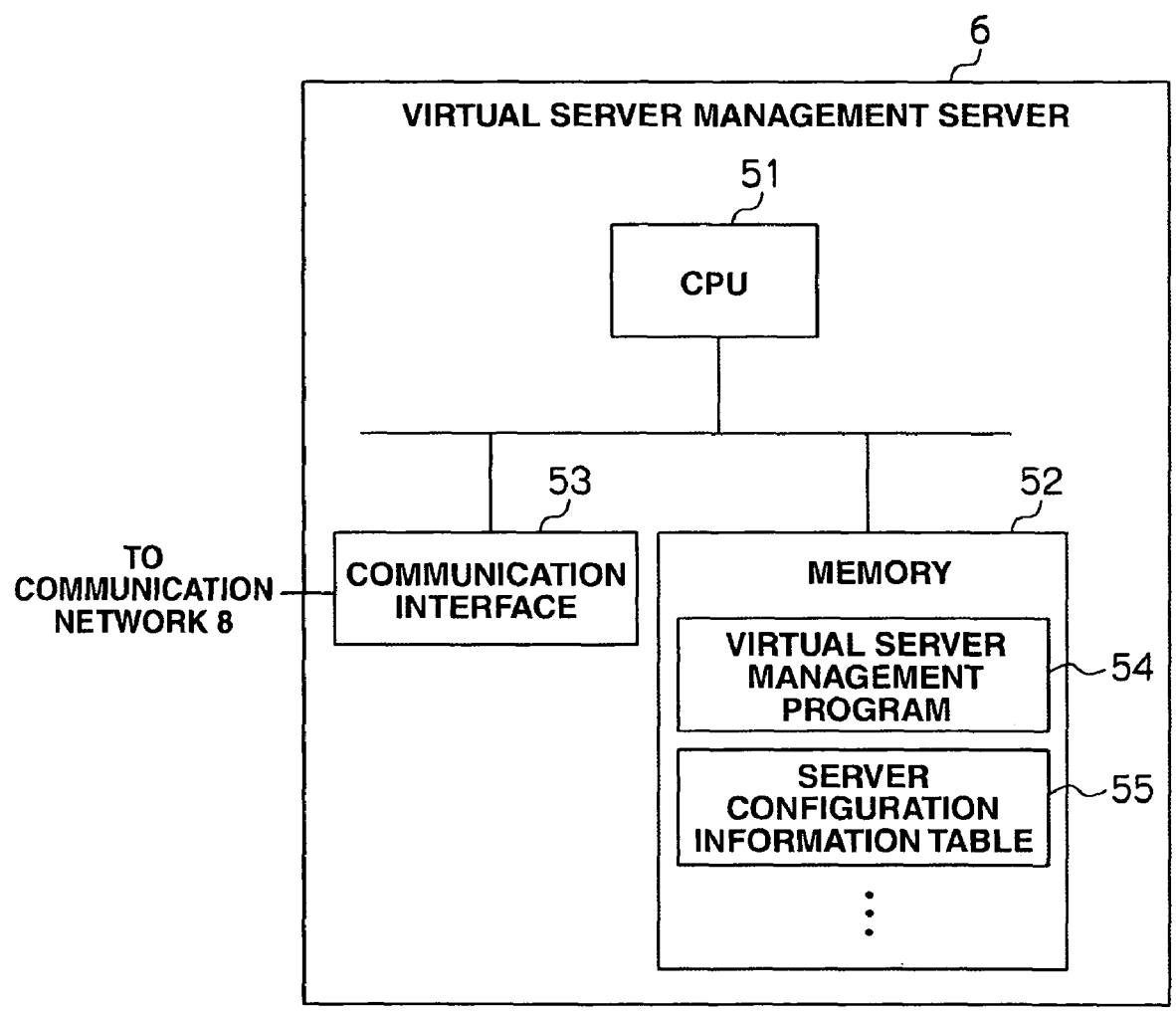
FIG. 5 is a block diagram showing the configuration of a virtual server management server.

FIG. 5 shows an example of the configuration of the virtual server management server 6. The virtual server management server 6 is configured by a CPU 51, a memory 52 and a communication interface 53 being connected via an internal bus or the like.

The CPU 51 controls the overall virtual server management server 6. The memory 52 stores a virtual server management program 54 and a server configuration information table 55. The specific configuration of the server configuration information table 55 will be described later. The communication IF 53 is connected to the communication network 8. The server configuration information table 55 is acquired by the CPU 51 from the physical server 2 at each prescribed timing and managed by the CPU 51 as a result of the virtual server management program 54 being executed.

Figure 6:
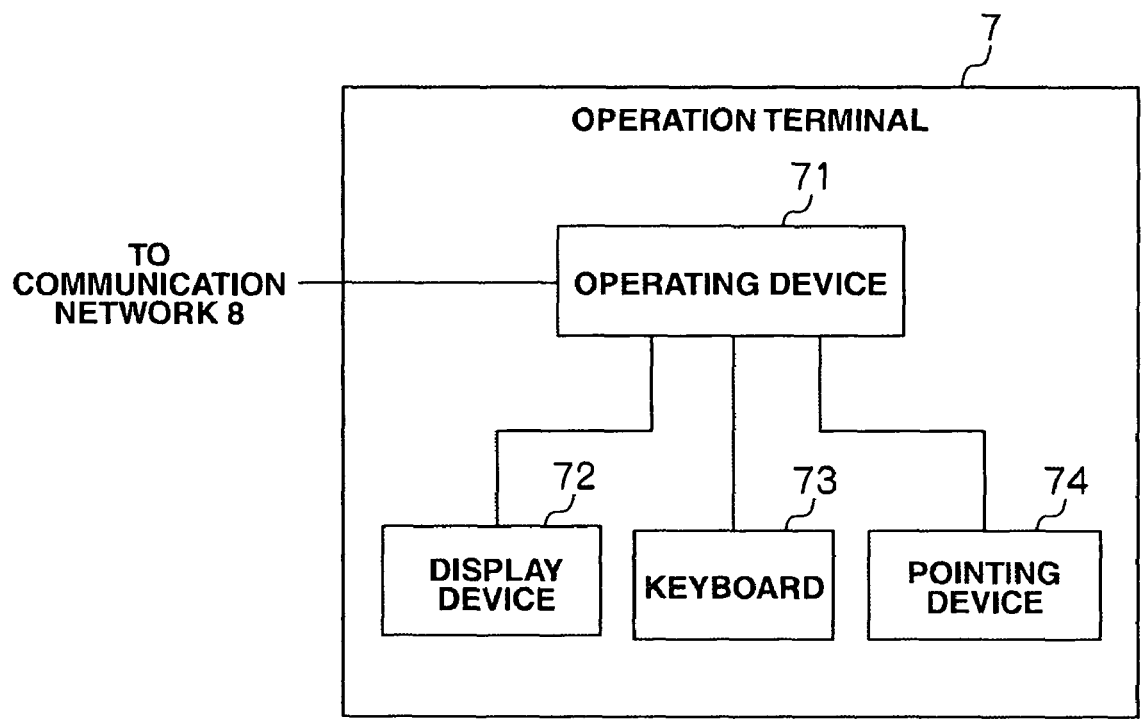
FIG. 6 is a block diagram showing the configuration of an operation terminal.

FIG. 6 shows an example of the configuration of the operation terminal 7. The operation terminal 7 is configured by an operating device 71, a display device 72, a keyboard 73 and a pointing device 74 being connected.

The operating device 71 is connected to the communication network 8. The operating device 71 displays information sent via the communication network 8 on the display device 72. The operating device 71 operates the device management server 4 and the virtual server management server 6 based on the user's operation of the keyboard 73 and the pointing device 74.

FIG. 7 shows an example of the configuration of the virtual storage configuration information table 81 included in the storage configuration information table 48 of the device management server 4.

The virtual storage configuration information table 81 is configured by the respective items of physical storage identifying information 81A, virtual storage identifying information 81B, controller band 81C, disk cache capacity 81D, and allocated physical disk capacity 81E being associated.

The physical storage identifying information 81A is identifying information for uniquely identifying the physical storage 3. The virtual storage identifying information 81B is identifying information for uniquely identifying the virtual storage 11. The controller band 81C is the band (Gbps) of the virtual controller (RAID controller 31) of the virtual storage 11. The disk cache capacity 81D is the capacity (virtual storage area 36) of the disk cache 32 to be used by the virtual storage 11. The allocated physical disk capacity 81E is the capacity (virtual storage VOL area 37) of the magnetic disk (not shown) of the logical volume 33 to be used by the virtual storage 11.

FIG. 8 shows an example of the configuration of the volume configuration information table 82 (table TC) included in the storage configuration information table 48 of the device management server 4.

The volume configuration information table 82 is configured by the respective items of virtual HBA WWN 82A, physical storage identifying information 82B, virtual storage identifying information 82C, volume identifying information 82D, virtual capacity 82E, used physical capacity 82F, volume attribute 82G, and usage 82H being associated.

The virtual HBA WWN 82A is the WWN (World Wide Name) of the source of the virtual HBA 10. The physical storage identifying information 82B is identifying information for uniquely identifying the physical storage 3. The virtual storage identifying information 82C is identifying information for uniquely identifying the virtual storage 11. The volume identifying information 82D is identifying information for uniquely identifying the logical volume 33.

The virtual capacity 82E is the virtual storage capacity of the logical volume 33. The virtual capacity 82E will be the virtual storage capacity if the logical volume 33 is a dynamic storage area allocation volume, but will be the actual storage capacity if the logical volume 33 is a physical volume. The used physical capacity 82F is the physical storage capacity that is being used by the logical volume 33 for storing data.

The volume attribute 82G is information for identifying whether the logical volume 33 is a dynamic storage area allocation volume or a physical volume. Here, the logical volume 33 is a dynamic storage area allocation volume if the volume attribute 82G is "HDP," and the logical volume 33 is a physical volume if the volume attribute 82G is "non-HDP."

The usage 82H shows the usage of the logical volume 33. For instance, if the usage 82H is "BOOT," this shows that the logical volume 33 is storing boot data.

FIG. 9 shows an example of the configuration of the virtual storage search policy table 83 included in the storage configuration information table 48 of the device management server 4.

The virtual storage search policy table 83 is configured by the respective items of condition name 83A and search condition 83B being associated.

The condition name 83A shows the name of the condition upon searching the virtual storage 11. The search condition 83B is the conditional statement upon searching virtual storage 11. For instance, "virtual storage 11 connected from virtual server 9" is searched from the conditional statement 2.

FIG. 10 shows an example of the configuration of the conditional statement for use in the virtual storage search policy table 83. The conditional statement is described, for example, in the SQL language. FIG. 10 shows an example in the case of the conditional statement 2.

With the conditional statement 2, a "virtual server identifying information" column of the table TA (described later), a "virtual HBA WWN" column of the table TB, a "physical HBA WWN" column of the table TB (described later), a "physical storage identifying information" column of the table TC, and a "virtual storage identifying information" column of the table TC are selected.

Subsequently, in the conditional statement 2, a virtual storage 11 connected to a virtual server 9 in which the "virtual server identifying information" column of the table TA and the "virtual server identifying information" column of the table TB are the same, and the "virtual HBA WWN" column of the table TB and the "virtual HBA WWN" column of the table TC are the same is searched based on the table TA, the table TB, and the table TC.

FIG. 11 shows an example of the configuration of the volume attribute policy table 84 included in the storage configuration information table 48 of the device management server 4.

The volume attribute policy table 84 is configured by the respective items of condition name 84A, search condition 84B and recommended volume attribute 84C being associated.

The condition name 84A is the name of the condition upon deciding the attribute of the logical volume 33. The search condition 84B is the conditional statement upon deciding the attribute of the logical volume 33. The recommended volume attribute 84C is the attribute of the logical volume 33 that is recommended upon deciding the attribute of the logical volume 33. For example, "BOOT" is decided by the conditional statement 6, and a dynamic storage area allocation volume is recommended as the attribute of the logical volume 33 to be allocated.

FIG. 12 shows an example of the configuration of the conditional statement to be used in the volume attribute policy table 84. The conditional statement is described, for example, in the SQL language. FIG. 12 shows an example in the case of the conditional statement 6.

With the conditional statement 2, a "usage" column of the table TA (described later) is selected, and a logical volume 33 in which the "usage" column of the table TA is "BOOT" is searched based on the table TA.

FIG. 13 shows an example of the configuration of the physical HBA repository information table 91 included in the server configuration information table 55 of the virtual server management server 6.

The physical HBA repository information table 91 is configured by the respective items of physical server identifying information 91A and physical HBA WWN 91B being associated. The physical server identifying information 91A is identifying information for uniquely identifying the physical server 2. The physical HBA WWN 91B is the WWN of the physical HBA 23 of the physical server 2.

FIG. 14 shows an example of the configuration of the virtual server repository information table 92 included in the server configuration information table 55 of the virtual server management server 6.

The virtual server repository information table 92 is configured by the respective items of virtual server identifying information 92A and physical server identifying information 92B being associated. The virtual server identifying information 92A is identifying information for uniquely identifying the virtual server 9. The physical server identifying information 92B is identifying information for uniquely identifying the physical server 2.

FIG. 15 shows an example of the configuration of the virtual HBA configuration information table 93 (table TB) included in the server configuration information table 55 of the virtual server management server 6.

The virtual HBA configuration information table 93 is configured by the respective items of virtual server identifying information 93A, virtual HBA WWN 93B and physical HBA WWN 93C being associated. The virtual server identifying information 93A is identifying information for uniquely identifying the virtual server 9. The virtual HBA WWN 93B is the WWN of the virtual HBA 10 of the virtual server 9. The physical HBA WWN 93C is the WWN of the physical HBA 23 of the physical server 2.

FIG. 16 shows an example of the configuration of the virtual server configuration information table 94 included in the server configuration information table 55 of the virtual server management server 6.

The virtual server configuration information table 94 is configured by the respective items of virtual server identifying information 94A, service rate 94B, CPU quantity 94C, and memory capacity 94D being associated. The virtual server identifying information 94A is identifying information for uniquely identifying the virtual server 9. The service rate 94B is the ratio that the virtual server 9 uses the CPU 21 of the physical server 2. The CPU quantity 94C is the number of CPUs virtually retained in the virtual server 9. The memory capacity 94D is the memory capacity (MB) to be used by the virtual server 9.

FIG. 17 shows an example of the configuration of the server identifying information table 95 included in the server configuration information table 55 of the virtual server management server 6.

The server identifying information table 95 is configured by the respective items of server identifying information 95A and attribute 95B being associated. The server identifying information 95A is identifying information for uniquely identifying the physical server 2 and the virtual server 9. The attribute 95B is information for identifying whether the server of the server identifying information 95A is a physical server 2 or a virtual server 9.

FIG. 18 shows an example of the configuration of the server identifying information table 96, which is another example of the server identifying information table 95 included in the server configuration information table 55 of the virtual server management server 6. The server identifying information table 96 is configured by the respective items of physical server identifying information 96A and virtual server identifying information 96B being arranged independently in sequence.

Figure 19:
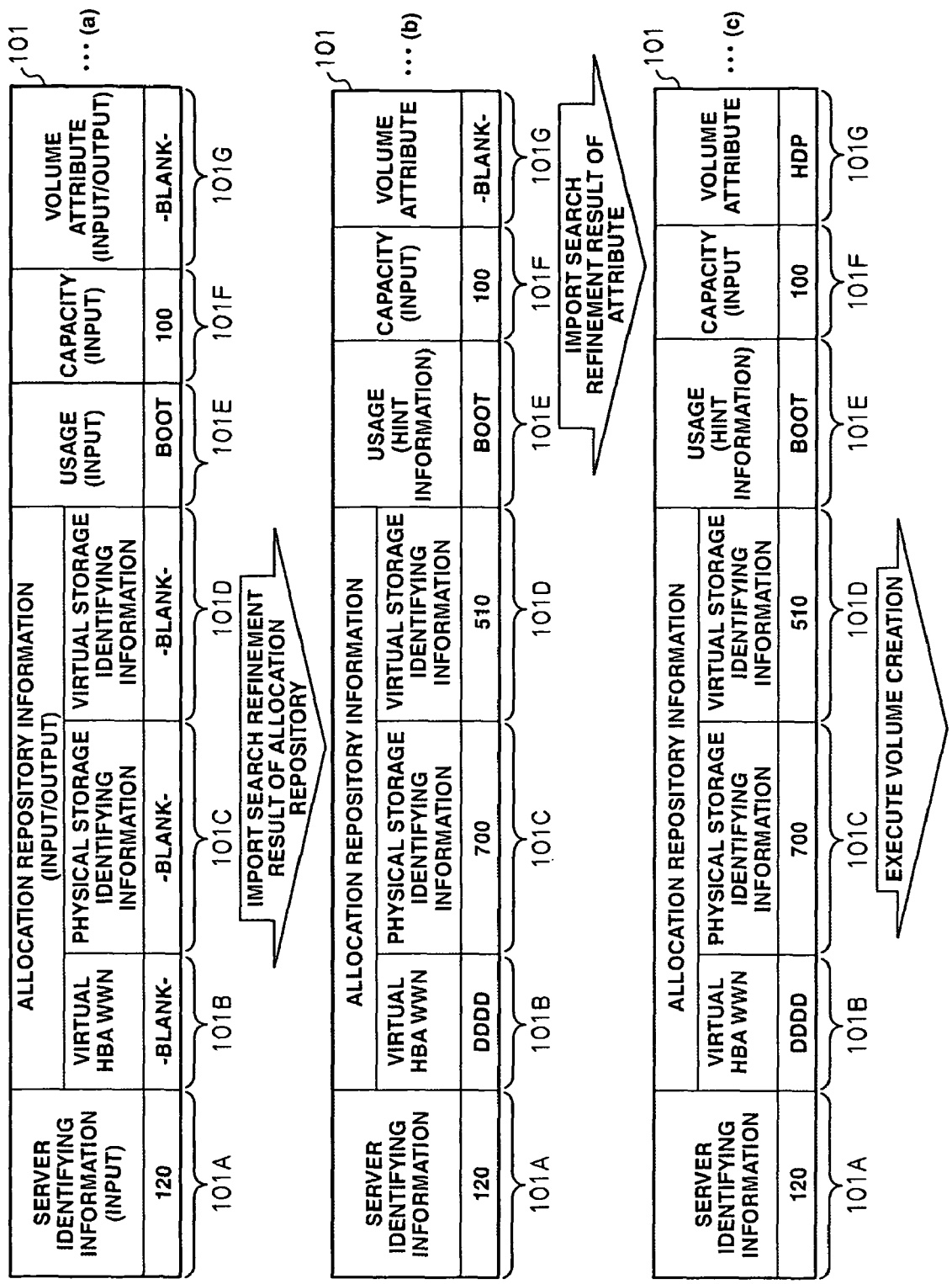
FIG. 19A to FIG. 19C are conceptual diagrams explaining the allocation sequence of a logical volume.

FIG. 19 shows an example of the allocation sequence of the logical volume 33 based on a volume allocation display screen 101 displayed on the display device 72 of the operation terminal 7.

The volume allocation display screen 101 is configured by a server identifying information column 101A, an allocation repository information column (virtual HBA WWN column 101B, physical storage identifying information column 101C, virtual storage identifying information column 101D), a usage column 101E, a capacity column 101F, and a volume attribute column 101G being associated.

The server identifying information column 101A is a column for inputting server identifying information. The virtual HBA WWN column 101B is a column for inputting and outputting the WWN of the virtual HBA 10. The physical storage identifying information column 101C is a column for inputting and outputting physical storage identifying information. The virtual storage identifying information column 101D is a column for inputting and outputting virtual storage identifying information. The usage column 101E is a column for inputting the usage of the logical volume 33 to be used. The capacity column 101F is a column for inputting the capacity of the logical volume 33 to be used. The volume attribute column 101G is a column for inputting and outputting the volume attribute of the logical volume 33 to be used.

When the operation terminal 7 receives a command for allocating a volume to the virtual server 9 based on the user's operation of the keyboard 73 and the pointing device 74, it displays the volume allocation display screen 101 on the display device 72.

Subsequently, the operation terminal 7 waits for a virtual storage search request to be issued as a result of the user inputting the server identifying information of the virtual server 9 to perform volume allocation in the server identifying information column 101A, inputting the usage of the logical volume 33 to perform volume allocation in the usage column 101E, and inputting the capacity of the logical volume 33 to perform volume allocation in the capacity column 101F. Here, on the volume allocation display screen 101, let it be assumed that "120" is input in the server identifying information column 101A, "BOOT" is input in the usage column 101E, and "100" (MB) is input in the capacity column 101F.

When the operation terminal 7 receives a virtual storage search request as a result of the information being input in each of the foregoing columns (FIG. 19A), it sends the virtual storage search request and the parameter of the input information to the device management server 4.

When the device management server 4 receives the virtual storage search request and information of the input parameter from the operation terminal 7, it executes the virtual storage search program 45 so as to create an input parameter information table 111 (table TA) in the work area 49.

FIG. 20 shows an example of the input parameter information table 111 created in the work area 49 of the device management server 4.

The input parameter information table 111 is configured by the respective items of server identifying information 111A, virtual HBA WWN 111B, physical storage identifying information 111C, virtual storage identifying information 111D, usage 111E, capacity 111F, and volume attribute 111G being associated.

The server identifying information 111A is identifying information for uniquely identifying the physical server 2 and the virtual server 9. The virtual HBA WWN 111B is the WWN of the virtual HBA 10 of the virtual server 9. The physical storage identifying information 111C is identifying information for uniquely identifying the physical storage 3. The virtual storage identifying information 111D is identifying information for uniquely identifying the virtual storage 11. The usage 111E shows the usage of the logical volume 33. The capacity 111F shows the virtual storage capacity of the logical volume 33. The volume attribute 111G is information for identifying whether the logical volume 33 is a dynamic storage area allocation volume or a physical volume.

Here, in the input parameter information table 111, let it be assumed that the server identifying information 111A is "120," the usage 111E is "BOOT" and the capacity 111F is "100" (MB).

The device management server 4 thereafter sends the virtual storage search policy table 83 to the operation terminal 7.

When the operation terminal 7 receives the virtual storage search policy table 83 from the device management server 4, it displays the virtual storage search policy table 83 on the display device 72, and waits for the user to select the search name of the virtual storage search policy table 83 to be used. Here, let it be assumed that "virtual storage apparatus connected from virtual server" of the virtual storage search policy table 83 has been selected.

Like this, with the storage system 1, the user is able to select the intended search condition according to the virtual storage search policy table 83.

When the search name of the virtual storage search policy table 83 is selected, the operation terminal 7 thereafter sends the selection result of the search name to the device management server 4.

When the device management server 4 receives the selection result of the search name of the virtual storage search policy table 83 from the operation terminal 7, it acquires the conditional statement corresponding to the selection result, and searches for the virtual storage 11 to be allocated with the logical volume 33 based on the conditional statement. Here, the device management server 4 searches for the virtual storage 11 to be allocated with the logical volume 33 according to the conditional statement 2 corresponding to the selected search name of "virtual storage apparatus connected from virtual server."

In other words, the device management server 4 searches for the virtual storage 11 connected to the virtual server 9 in which the server identifying information is "120."

Specifically, the device management server 4 searches for the same server identification number as "120," which is the server identifying information 111A of the input parameter information table 111 (table TA), from the virtual HBA configuration information table 93 (table TB). The device management server 4 thereafter searches for the same virtual HBA WWN as "CCCC" and "DDDD," which are the virtual HBA WWN 93B of the virtual HBA configuration information table 93 in which the server identifying information 111A is "120," from the volume configuration information table 82 (table TC).

Subsequently, the device management server 4 creates a virtual storage search result information table 112, which is the search result of the virtual storage 11 connected to the virtual server 9, in the work area 49 based on the virtual HBA configuration information table 93 and the volume configuration information table 82.

FIG. 21 shows an example of the virtual storage search result information table 112 created in the work area 49 of the device management server 4.

The virtual storage search result information table 112 is configured by the respective items of virtual server identifying information 112A, virtual HBA WWN 112B, physical HBA WWN 112C, physical storage identifying information 112D, and virtual storage identifying information 112E being associated.

The virtual server identifying information 111A is identifying information for uniquely identifying the virtual server 9. The virtual HBA WWN 112B, the physical HBA WWN 112C, the physical storage identifying information 112D and the virtual storage identifying information 112E are information searched from the virtual HBA configuration information table 93 and the volume configuration information table 82 based on the virtual server identifying information 111A. The virtual HBA WWN 111B is the WWN of the virtual HBA 10 of the virtual server 9. The physical HBA WWN 112C is the WWN of the physical HBA 23 of the physical server 2. The physical storage identifying information 112D is identifying information for uniquely identifying the physical storage 3. The virtual storage identifying information 112E is identifying information for uniquely identifying the virtual storage 11.

The device management server 4 thereafter searches for the status of the searched virtual storage 11 and sums it up as a summary.

Specifically, the device management server 4 searches for the status information of the virtual storages 11 in which the virtual storage identifying information 112E of the virtual storage search result information table 112 is "500" and "510" from the storage configuration information table 48, and the server configuration information table 55 acquired from virtual server management server 6.

Subsequently, the device management server 4 creates a virtual storage status search result information table 113, which is the search result of the status of the virtual storage 11, in the work area 49 based on the storage configuration information table 48, and the server configuration information table 55 acquired from the virtual server management server 6.

FIG. 22 shows an example of the virtual storage status search result information table 113 created in the work area 49 of the device management server 4.

The virtual storage status search result information table 113 is configured by the respective items of physical storage identifying information 113A, virtual storage identification 113B, and virtual storage summary being associated. The virtual storage summary is configured from the respective items of controller band 113C, disk cache capacity 113D, virtual server quantity 113E, accumulation 113F, volume count 113G, virtual capacity 113H, used physical capacity 113I, and allocated physical disk capacity 113J.

The physical storage identifying information 113A is identifying information for uniquely identifying the physical server 2. The virtual storage identification 113B is identifying information for uniquely identifying the virtual storage 11.

The virtual storage summary is information searched from the storage configuration information table 48 and the server configuration information table 55 acquired from the virtual server management server 6 based on the virtual storage identifying information 113B.

The controller band 113C is the band (Gbps) of the virtual controller (RAID controller 31) of the virtual storage 11. The disk cache capacity 113D is the capacity (virtual storage area 36) of the disk cache 32 to be used by the virtual storage 11. The virtual server quantity 113E is the number of virtual servers 9 connected to the virtual storage 11. The accumulation 113F is information obtained by multiplying and accumulating the service rate of the connected virtual server 9 with the virtual CPU of the virtual server 9. The volume count 113G is the number of logical volumes 33 retained in the virtual storage 11.

The virtual capacity 113H is the total virtual storage capacity of the logical volume 33. The virtual capacity 82E will be the virtual storage capacity if the logical volume 33 is a dynamic storage area allocation volume, and be the actual storage capacity if the logical volume 33 is a physical volume. The used physical capacity 113I is the total physical storage capacity being used by the logical volume 33 for storing data. The allocated physical disk capacity 113J is the total physical storage capacity being used by the logical volume 33. The allocated physical disk capacity 113J will be the storage capacity of the allocated physical volume if the logical volume 33 is a dynamic storage area allocation volume, and will be the same as the storage capacity of the physical volume if the logical volume 33 is a physical volume.

Subsequently, the device management server 4 creates a virtual storage candidate list information table 114 in the work area 49 based on the virtual storage search result information table 112 and the virtual storage status search result information table 113.

FIG. 23 shows an example of the virtual storage candidate list information table 114 creates in the work area 49 of the device management server 4.

The virtual storage candidate list information table 114 is configured by the respective items of physical storage identifying information 113A, virtual storage identification 113B, virtual HBA WWN 114C, physical HBA WWN 114D, and virtual storage summary 114E being associated.

The physical storage identifying information 113A, the virtual storage identification 113B, the virtual HBA WWN 114C and the physical HBA WWN 114D are the same information as the physical storage identifying information 112D, the virtual storage identifying information 112E, the virtual HBA WWN 112B and the physical HBA WWN 112C of the virtual storage search result information table 112. The virtual storage summary 114E is the same information as the controller band 113C, the disk cache capacity 113D, the virtual server quantity 113E, the accumulation 113F, the volume count 113G, the virtual capacity 113H, the used physical capacity 113I and the allocated physical disk capacity 113J as the virtual storage summary of the virtual storage status search result information table 113.

The device management server 4 thereafter sends the virtual storage candidate list information table 114 to the operation terminal 7.

When the operation terminal 7 receives the virtual storage candidate list information table 114 from the device management server 4, it displays the virtual storage candidate list information table 114 on the display device 72, and waits for the user to select the virtual storage 11 of the virtual storage candidate list information table 114 to be used. Here, let it be assumed that the virtual storage 11 in which the virtual storage identifying information 114B of the virtual storage candidate list information table 114 is "510" has been selected.

Like this, with the storage system 1, the user is able to select the intended virtual storage 11 according to the virtual storage candidate list information table 114.

When the virtual storage identifying information 114B of the virtual storage candidate list information table 114 is selected, the operation terminal 7 reflects the virtual storage identifying information 114B, the physical storage identifying information 114A corresponding to the virtual storage identifying information 114B and the virtual HBA WWN 114C in the virtual HBA WWN 101B, the physical storage identifying information 101C and the virtual storage identifying information 101D of the input parameter information table 111.

Here, among the virtual HBA WWN 101B, the physical storage identifying information 101C and the virtual storage identifying information 101D which are "BLANK," the operation terminal 7 inputs "DDDD" in the virtual HBA WWN 101B, "700" in the physical storage identifying information 101C, and "510" in the virtual storage identifying information 101D.

When the operation terminal 7 receives a volume attribute search request as a result of the information being input in each of the foregoing columns (FIG. 19B), it sends the volume attribute search request and the parameter of the input information to the device management server 4.

When the device management server 4 receives the volume attribute search request and information of the input parameter from the operation terminal 7, it executes the volume attribute search program 46 so as to reflect the information of the input parameter in the input parameter information table 111.

The device management server 4 thereafter refers to the volume attribute policy table 84, and searches for a search condition that coincides with the search condition 84B among all registered search conditions 84B.

Specifically, the device management server 4 searches for an attribute of the logical volume 33 to be allocated according to the conditional statement 6 as the search condition 83B corresponding to the condition name 83A. In other words, the device management server 4 searches for the usage 101E of the input parameter information table 111 (table TA). Since the usage 101E of the input parameter information table 111 (table TA) is "BOOT," the device management server 4 determines that the search condition coincides with the conditional statement 6.

The device management server 4 creates a volume attribute search result information table 115, which is the search result of the search condition that coincides with the search condition 84B, in the work area 49.

FIG. 24 shows an example of the volume attribute search result information table 115 created in the work area 49 of the device management server 4.

The volume attribute search result information table 115 is configured by the respective items of condition name 115A and recommended volume attribute 115B being associated. The condition name 115A is the condition name corresponding to the searched search condition 84B. The recommended volume attribute 115B is the attribute of the recommended logical volume 33 in relation to the condition name 115A.

The device management server 4 thereafter sends the volume attribute search result information table 115 to the operation terminal 7.

When the operation terminal 7 receives the volume attribute search result information table 115 from the device management server 4, it displays the volume attribute search result information table 115 on the display device 72, and waits for the user to select the attribute of the logical volume 33 of the volume attribute search result information table 115 to be used. Here, let it be assumed that "HDP" as the recommended volume attribute 115B of the condition name 115A of "BOOT" in the virtual storage candidate list information table 114.

Like this, with the storage system 1, the user is able to select the intended logical volume 33 according to the volume attribute search result information table 115.

When the recommended volume attribute 115B of the virtual storage candidate list information table 114 is selected, the operation terminal 7 reflects the recommended volume attribute 115B in the volume attribute 101G of the input parameter information table 111. Here, the operation terminal 7 inputs "HDP" in the volume attribute 101G that is "BLANK."

When the operation terminal 7 receives a volume allocation request as a result of the information being input in each of the foregoing columns (FIG. 19C), it sends the volume allocation request and the parameter of the input information to the device management server 4.

When the device management server 4 receives the volume allocation request and information of the input parameter from the operation terminal 7, it reflects the information of the input parameter in the input parameter information table 111.

The device management server 4 confirms the information of the parameter input by the user of the operation terminal 7, and thereafter sends a command to the physical server 2 for creating a logical volume 33 based on the input parameter information table 111 and allocating it to the virtual storage 11. Here, the device management server 4 creates a dynamic storage area allocation volume having a storage capacity of "100" (MB), and sends a command to the physical storage 3 in which the physical storage identifying information is "700" for allocating such dynamic storage area allocation volume to the virtual storage 11 in which the virtual storage identifying information is "510" of the physical storage 3 in which the physical storage identifying information is "700."

When the physical storage 3 receives a command from the device management server 4 for creating a logical volume 33 and allocating it to the virtual storage 11, it creates the logical volume 33 and allocates it to the virtual storage 11 based on the command, and sends a command completion reply to the device management server 4.

When the device management server 4 receives a completion reply from the physical storage 3 in response to the command for allocating the logical volume 33 to the virtual storage 11, it reflects such completion reply in the virtual storage configuration information table 81 and the volume configuration information table 82.

Like this, the device management server 4 is able to suitably allocate a virtual storage 11 or a logical volume 33 in correspondence with the configuration of the virtual server 9.

The volume allocation display screen 101 to be displayed on the display device 72 of the operation terminal 7 may be graphically based as shown in FIG. 19, or may be based on a command line.

Figure 25:
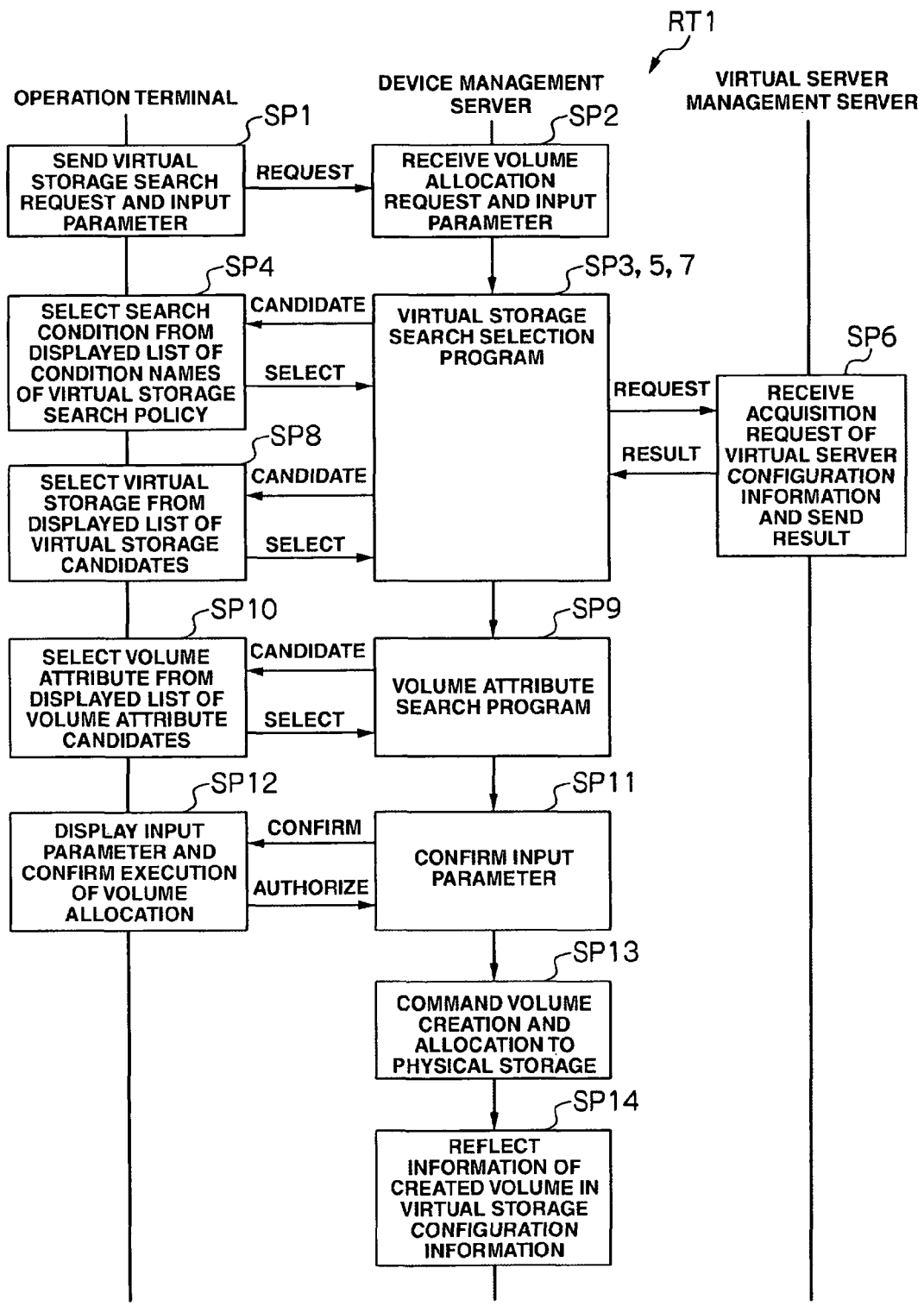
FIG. 25 is a sequence chart showing the volume allocation processing routine.

FIG. 25 is an example of the sequence chart showing the specific processing routine of the operation terminal 7, the device management server 4 and the virtual server management server 6 concerning the volume allocation processing in the storage system 1.

When the operation terminal 7 receives a command for allocating the logical volume 33 to the virtual server 9 based on the user's operation of the keyboard 73 and the pointing device 74, it displays the volume allocation display screen 101 on the display device 72 and, when information is input to the volume allocation display screen 101, sends a virtual storage search request and information of the input parameter to the device management server 4 according to the volume allocation processing routine RT1 shown in FIG. 25 (SP1).

The device management server 4 thereafter receives the virtual storage search request and information of the input parameter from the operation terminal 7 (SP2). Subsequently, the device management server 4 creates the input parameter information table 111 and reflects the input information therein based on the virtual storage search program 45, and sends the virtual storage search policy table 83, which is a list of policies for the user to select the virtual storage 11, to the operation terminal 7 (SP3).

When the operation terminal 7 receives the virtual storage search policy table 83 from the device management server 4, it displays the virtual storage search policy table 83 on the display device 72 and, after the user selects the search name of the virtual storage search policy table 83 to be used, sends the selection result of the search name to the device management server 4 (SP4).

When the device management server 4 receives the selection result of the search name of the virtual storage search policy table 83 from the operation terminal 7, it creates the virtual storage search result information table 112 based on the virtual storage search program 45. The device management server 4 thereafter sends an acquisition request of the server configuration information table 55 to the virtual server management server 6 (SP5).

When the virtual server management server 6 receives the acquisition request of the server configuration information table 55 from the device management server 4, it sends the server configuration information table 55 to the device management server 4 (SP6).

When the device management server 4 receives the server configuration information table 55 from the virtual server management server 6, it creates the virtual storage status search result information table 113 based on the virtual storage search program 45. The device management server 4 thereafter sends the virtual storage candidate list information table 114, which is a list of candidates of the virtual storage 11, to the operation terminal 7 (SP7).

When the operation terminal 7 receives the virtual storage candidate list information table 114 from the device management server 4, it displays the virtual storage candidate list information table 114 on the display device 72 and, after the user selects the virtual storage 11 of the virtual storage candidate list information table 114 to be used, reflects the information in the volume allocation display screen 101, and sends the volume attribute search request and information of the input parameter to the device management server 4 (SP8).

When the device management server 4 receives the volume attribute search request and information of the input parameter from the operation terminal 7, it reflects the input in the input parameter information table 111, refers to the volume attribute policy table 84, and searches whether there is a search condition that coincides with the search condition 84B among all registered search condition 84B based on the volume attribute search program 46. The device management server 4 thereafter creates the volume attribute search result information table 115, which is a list of attribute candidates of the logical volume 33 that coincide with the search condition 84B, and sends the volume attribute search result information table 115 to the operation terminal 7 (SP9).

When the operation terminal 7 receives the volume attribute search result information table 115 from the device management server 4, it displays the volume attribute search result information table 115 on the display device 72 and, after the user selects the attribute of the logical volume 33 of the volume attribute search result information table 115 to be used, reflects the information in the volume allocation display screen 101, and sends the volume allocation request and information of the input parameter to the device management server 4 (SP10).

When the device management server 4 receives the volume allocation request and information of the input parameter from the operation terminal 7, it reflects the information of the input parameter in the input parameter information table 111 based on the volume attribute search program 46, and sends the input parameter information table 111 and the confirmation request to the operation terminal 7 (SP11).

When the operation terminal 7 receives the input parameter information table 111 and the confirmation request from the device management server 4, it displays the input parameter information table 111 on the display device 72 and, after the user confirms the input information and confirms the execution of the volume allocation, sends the allocation authorization reply of the logical volume 33 to the device management server 4 (SP12).

When the device management server 4 receives the allocation authorization reply of the logical volume 33 from the operation terminal 7, it sends a command to the physical server 2 for creating the logical volume 33 based on the input parameter information table 111 and allocating it to the virtual storage 11 (SP13).

When the physical storage 3 receives a command from the device management server 4 for creating the logical volume 33 and allocating it to the virtual storage 11, it creates the logical volume 33 and allocates it to the virtual storage 11 based on the command, and sends a command completion reply to the device management server 4.

When the device management server 4 receives a completion reply from the physical storage 3 in response to the command for allocating the logical volume 33 to the virtual storage 11, it reflects such completion reply in the virtual storage configuration information table 81 and the volume configuration information table 82 (SP14), and thereafter ends the volume allocation processing routine RT1 shown in FIG. 25.

Figure 26:
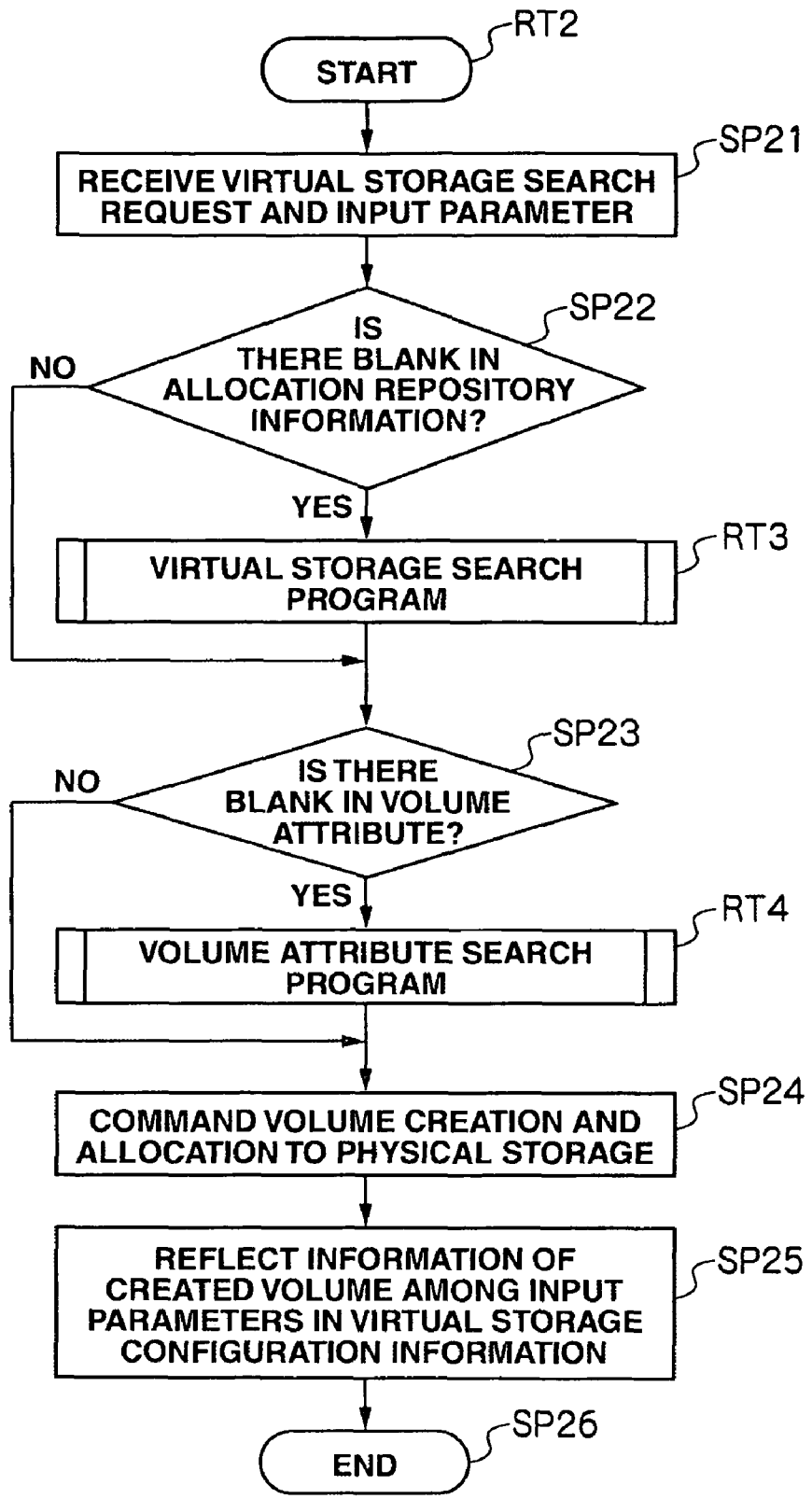
FIG. 26 is a flowchart showing the volume allocation processing routine.

FIG. 26 is an example of a flowchart showing the specific processing routine of the CPU 41 of the device management server 4 concerning the volume allocation processing of the device management server 4 in the storage system 1.

The CPU 41 of the device management server 4 waits to receive the virtual storage search request and information of the input parameter from the operation terminal 7 according to the volume allocation processing routine RT2 shown in FIG. 26 (SP21).

When the CPU 41 of the device management server 4 eventually receives the virtual storage search request and information of the input parameter from the operation terminal 7, it checks whether there is a blank in the allocation repository information of the input parameter information table 111 (SP22).

If there is no blank in the allocation repository information of the input parameter information table 111 (SP22: NO), the CPU 41 of the device management server 4 proceeds to step SP23. Meanwhile, if there is a blank in the allocation repository information of the input parameter information table 111 (SP22: YES), the CPU 41 of the device management server 4 executes the virtual storage search program 45 (RT3).

The CPU 41 of the device management server 4 eventually checks whether there is a blank in the volume attribute 111G of the input parameter information table 111 (SP23).

If there is no blank in the volume attribute 111G of the input parameter information table 111 (SP23: NO), the CPU 41 of the device management server 4 proceeds to step SP24. Meanwhile, if there is a blank in the volume attribute 111G of the input parameter information table 111 (SP23: YES), the CPU 41 of the device management server 4 executes the volume attribute search program 46 (RT4).

The CPU 41 of the device management server 4 eventually sends a command to the physical server 2 for creating the logical volume 33 and allocating it to the virtual storage 11 based on the input parameter information table 111 (SP24).

Subsequently, the device management server 4 reflects the information of the created logical volume 33 in the virtual storage configuration information table 81 and the volume configuration information table 82 (SP25), and thereafter ends the volume allocation processing routine RT2 shown in FIG. 26.

Figure 27:
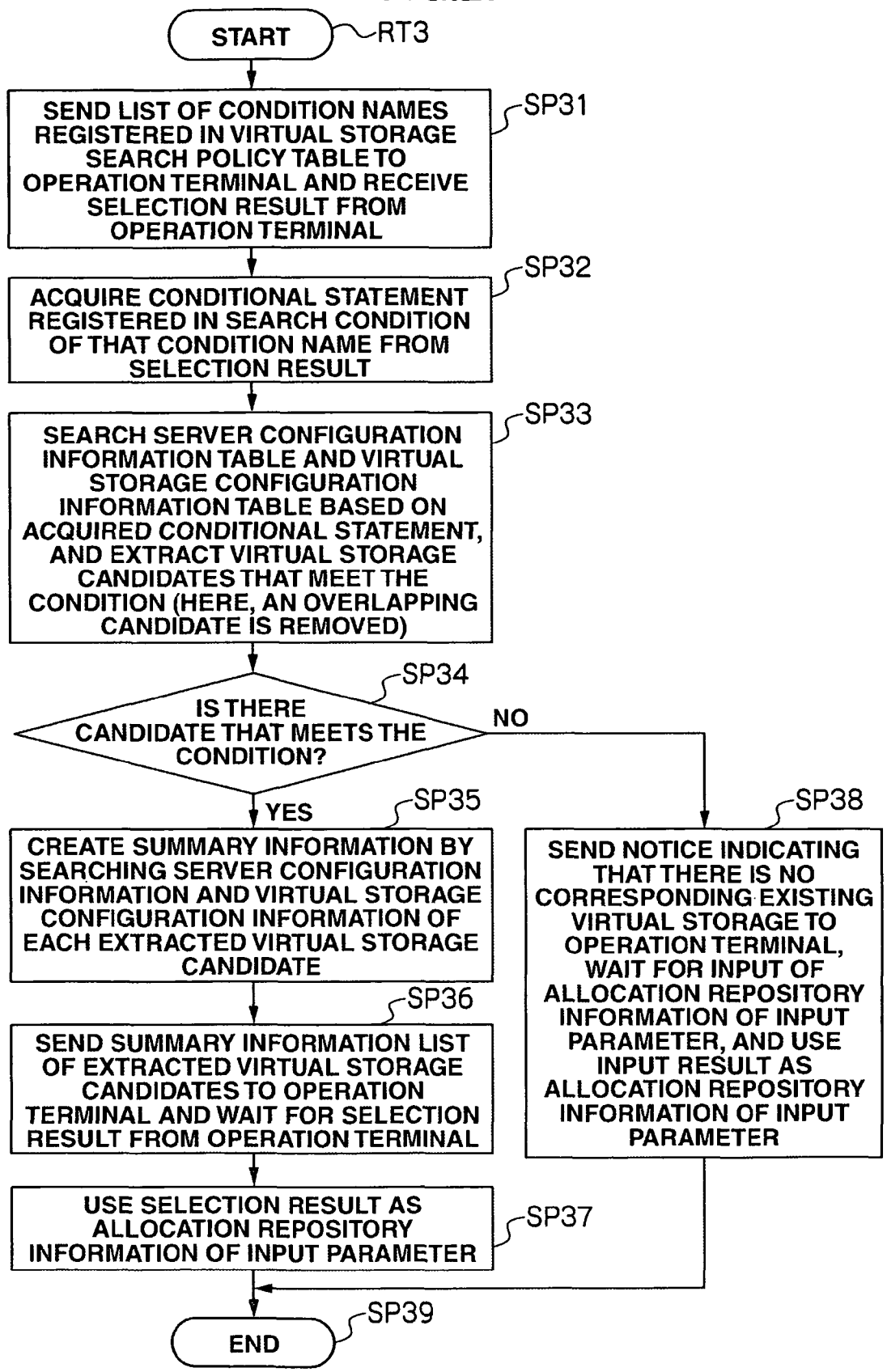
FIG. 27 is a flowchart showing the virtual storage search processing routine.

FIG. 27 is an example of a flowchart showing the specific processing routine of the CPU 41 of the device management server 4 concerning the virtual storage search processing of the device management server 4 in the storage system 1.

The CPU 41 of the device management server 4 executes the virtual storage search program 45 and, according to the virtual storage search processing routine RT3 shown in FIG. 27, sends a list of the condition names 83A registered in the virtual storage search policy table 83 to the operation terminal 7, and waits to receive the selection result of the search name of the virtual storage search policy table 83 from the operation terminal 7 (SP31).

The CPU 41 of the device management server 4 thereafter acquires the conditional statement registered in the search condition of the search name from the selection result of the search name of the virtual storage search policy table 83 (SP32).

Subsequently, the CPU 41 of the device management server 4 searches the server configuration information table 55 and the storage configuration information table 48 based on the acquired conditional statement, and extracts candidates of the virtual storage 11 that coincide with the condition (here, an overlapping candidate is removed) (SP33).

The CPU 41 of the device management server 4 thereafter checks whether there is a candidate of the virtual storage 11 that coincides with the condition (SP34). If there is a candidate of the virtual storage 11 that coincides with the condition (SP34: YES), the CPU 41 of the device management server 4 searches the server configuration information table 55 and the storage configuration information table 48 and creates the virtual storage candidate list information table 114 as the summary information regarding each of the extracted candidates of the virtual storage 11 (SP35).

Subsequently, the device management server 4 sends a summary information list (virtual storage candidate list information table 114) regarding the extracted candidates of the virtual storage 11 to the operation terminal 7, and awaits the selection result (volume attribute search request and information of input parameter) from the operation terminal (SP36).

The device management server 4 reflects the selection result as the allocation repository information of the input parameter information table 111 (SP37), and thereafter ends the virtual storage search processing routine RT3 shown in FIG. 27 (SP39).

Meanwhile, if there is no candidate of the virtual storage 11 that coincides with the condition (SP34: NO), the CPU 41 of the device management server 4 sends a notice indicating that there is no corresponding existing virtual storage 11 to the operation terminal 7, awaits input of the allocation repository information of the input parameter information table 111, reflects the input result (volume attribute search request and information of input parameter) as the allocation repository information of the input parameter information table 111 (SP37), and thereafter ends the virtual storage search processing routine RT3 shown in FIG. 27 (SP39).

Figure 28:
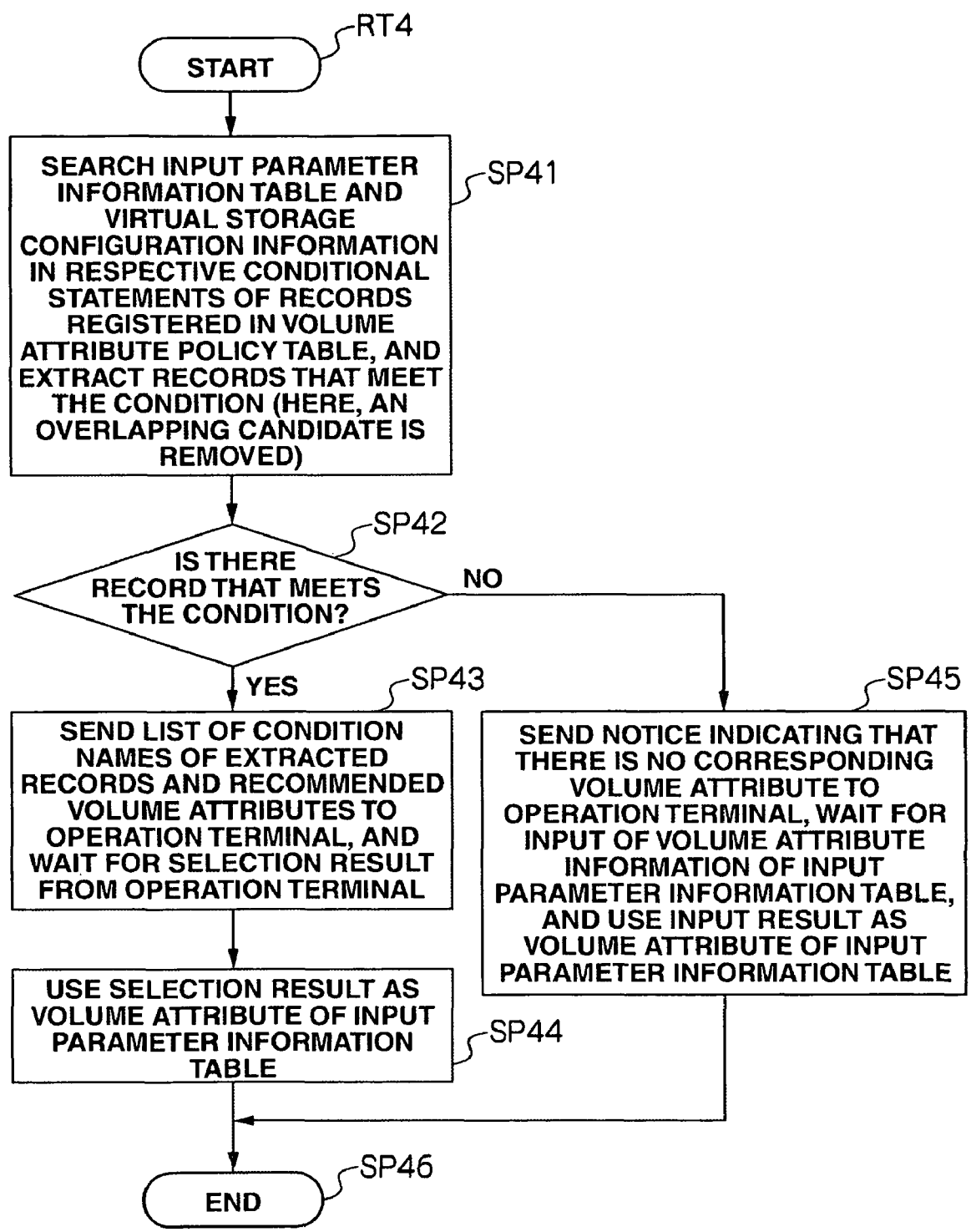
FIG. 28 is a flowchart showing the volume attribute search processing routine.

FIG. 28 is an example of a flowchart showing the specific processing routine of the CPU 41 of the device management server 4 concerning the volume attribute search processing of the device management server 4 in the storage system 1.

When the CPU 41 of the device management server 4 executes the volume attribute search program 46 and, according to the volume attribute search processing routine RT4 shown in FIG. 28, receives the volume attribute search request and information of the input parameter from the operation terminal 7, it searches the input parameter information table 111 and the storage configuration information table 48 with the conditional statement of the respective records of the search conditions registered in the volume attribute policy table 84, and extracts records that coincide with the condition (here, an overlapping candidate is removed) (SP41).

The CPU 41 of the device management server 4 thereafter checks whether there is a record that coincides with the condition (SP42). If there is a record that coincides with the condition (SP42: YES), the CPU 41 of the device management server 4 sends a list (volume attribute search result information table 115) of the condition names and recommended volume attributes of the extracted records to the operation terminal, and awaits the selection result (volume allocation request and information of input parameter) from the operation terminal (SP43).

The device management server 4 reflects the selection result as the volume attribute of the input parameter information table 111 (SP44), and thereafter ends the volume attribute search processing routine RT4 shown in FIG. 28 (SP46).

Meanwhile, if there is no record that coincides with the condition (SP42: NO), the CPU 41 of the device management server 4 sends a notice indicating that there is no corresponding volume attribute to the operation terminal 7, awaits the input of the volume attribute of the input parameter information table 111, reflects the input result (volume attribute search request and information of the input parameter) as the volume attribute of the input parameter information table 111 (SP45), and thereafter ends the volume attribute search processing routine RT4 shown in FIG. 28 (SP46).

Figure 29:
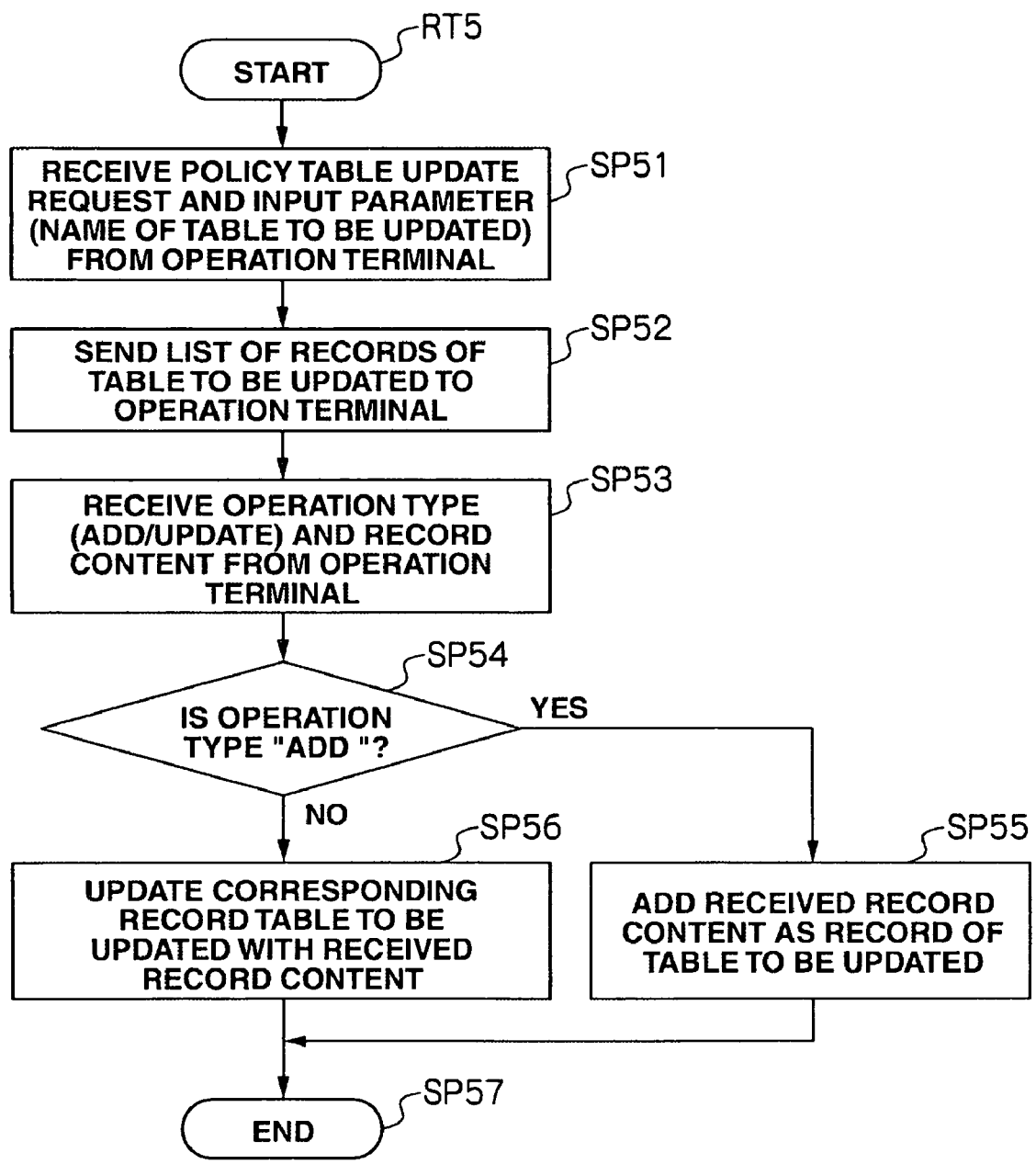
FIG. 29 is a flowchart showing the policy table update processing routine.

FIG. 29 is an example of a flowchart showing the specific processing routine of the CPU 41 of the device management server 4 concerning the policy table update processing of the device management server 4 in the storage system 1.

The CPU 41 of the device management server 4 executes the policy table update program 47 and, according to the policy table update processing routine RT5 shown in FIG. 29, waits to receive the policy table update request and information of the input parameter (name of tables to be updated) from the operation terminal 7 (SP51). For instance, the operation terminal 7 sends the policy table update request and information on the names of the virtual storage search policy table 83 to the device management server 4.

The CPU 41 of the device management server 4 thereafter sends a list of records of the tables to be updated to the operation terminal 7 (SP52). For instance, the CPU 41 of the device management server 4 sends a list of records of the virtual storage search policy table 83 to the operation terminal 7.

Subsequently, the CPU 41 of the device management server 4 waits to receive the operation type of "Add" or "Update" and the record contents from the operation terminal 7 (SP53). For instance, the operation terminal 7 sends information to the device management server 4 for adding the contents of a prescribed record to the virtual storage search policy table 83.

The CPU 41 of the device management server 4 thereafter checks whether the information of the received operation type is "Add" (SP54). If the information of the received operation type is "Add" (SP54: YES), the CPU 41 of the device management server 4 adds the received record contents as the record of the table to be updated (SP55), and thereafter ends the policy table update processing routine RT5 shown in FIG. 29 (SP57). For instance, if the CPU 41 of the device management server 4 receives information from the operation terminal 7 for adding the contents of a prescribed record to the virtual storage search policy table 83, it adds the contents of such record as the record of the virtual storage search policy table 83.

Meanwhile, if the information of the received operation type is not "Add" (SP54: NO), the CPU 41 of the device management server 4 updates the record corresponding to the table to be updated with the received record contents (SP56), and thereafter ends the policy table update processing routine RT5 shown in FIG. 29 (SP57).

Like this, the device management server 4 is able to allocate a virtual storage 11 or a logical volume 33 corresponding to the operation policy of individual users based on the policy table with conditional statements registered therein.

The device management server 4 is also able to add or update the record of the volume attribute policy table 84 according to the same method described above.

Like this, when the storage system 1 according to the present embodiment receives a command for allocating the logical volume 33 to the virtual server 9 is received, based on the parameter input by the user in the volume allocation display screen 101 and according to the virtual storage search policy table 83, it selects the virtual storage 11 to be allocated to the virtual server 9, thereafter selects the attribute of the logical volume 33 to be allocated to the virtual storage 11 allocated to the virtual server 9 according to the volume attribute search policy table 84, creates the selected logical volume 33, and allocates the created logical volume 33 to the virtual storage 11 allocated to the virtual server 9.

Accordingly, with the storage system 1, a virtual storage 11 or a logical volume 33 can be suitably allocated in correspondence with the configuration of the virtual server 9.

In addition, with the storage system 1, by adding or updating the record of the virtual storage search policy table 83 or the volume attribute policy table 84, a virtual storage 11 or a logical volume 33 in correspondence with the operation policy of individual users can be allocated based on the policy table with conditional statements registered therein.

Although this embodiment explained a case where the operation terminal 7 operated the device management server 4, the present invention is not limited to this configuration, and, for example, the device management server may include the function of the operation terminal 7, and the present invention can be applied to various other configurations.

Although this embodiment explained a case where the device management server 4 and the virtual server management server 6 are provided independently, the present invention is not limited to the foregoing configuration, and, for example, there may be only one management apparatus, and the present invention can be applied to various other configurations.

The present invention can be broadly applied to storage systems that virtualize a storage apparatus into a plurality of virtual storage apparatuses.

What is claimed is:

1. A storage system, comprising:

a server apparatus for sending and receiving data sent from a client apparatus;

a storage apparatus including a volume for storing the data; and a management apparatus for managing the storage apparatus;

wherein the server apparatus comprises:

a plurality of virtual server units for controlling the sending and receiving of the data independently for each prescribed client apparatus;

wherein the storage apparatus comprises:

a plurality of virtual storage units including the volume independently for each prescribed virtual server unit for storing the data; and wherein the management apparatus comprises:

a virtual storage selection unit for selecting the virtual storage unit to be allocated to the virtual server unit according to a virtual storage search policy table for searching the virtual storage unit based on a parameter input by a user when a command is issued for allocating the volume to the virtual server unit;

a volume selection unit for selecting the type of the volume to be allocated to the virtual storage unit allocated to the virtual server unit with the virtual storage allocation unit according to a volume type search policy table for searching the type of the volume based on the parameter; and a volume allocation unit for creating the volume selected with the volume selection unit based on the parameter and allocating the created volume to the virtual storage unit allocated to the virtual server unit with the virtual storage allocation unit, and wherein the virtual storage selection unit presents the virtual storage search policy table to the user for the user to select a search condition, searches for the virtual storage unit according to a conditional statement corresponding to the search condition, presents candidates of the virtual storage unit together with the status of the virtual storage unit to the user for the user to select the virtual storage unit, and selects the virtual storage unit to be allocated to the virtual server unit based on the selection input by the user.

2. The storage system according to claim 1, wherein the volume selection unit searches for a conditional statement that coincides with the conditional statement among all conditional statements registered in the volume type search policy table and presents candidates of the volume to the user for the user to select the volume, and selects the type of the volume to be allocated to the virtual storage unit allocated to the virtual server unit.

3. The storage system according to claim 1, further comprising a policy table update unit for adding or updating the content of the virtual storage search policy table or the volume type search policy table.

4. A volume allocation method of a storage comprising a server apparatus for sending and receiving data sent from a client apparatus, a storage apparatus including a volume for storing the data, and a management apparatus for managing the storage apparatus, wherein the server apparatus comprises:
a plurality of virtual server units for controlling the sending and receiving of the data independently for each prescribed client apparatus;

wherein the storage apparatus comprises:
a plurality of virtual storage units including the volume independently for each prescribed virtual server unit for storing the data; and wherein the volume allocation method comprises:
a first step of a virtual storage selection of the management apparatus selecting the virtual storage unit to be allocated to the virtual server unit according to a virtual storage search policy table for searching the virtual storage unit based on a parameter input by a user when a command is issued for allocating the volume to the virtual server unit;
a second step of a volume selection unit of the management apparatus selecting the type of the volume to be allocated to the virtual storage unit allocated to the virtual server unit with the virtual storage allocation unit according to a volume type search policy table for searching the type of the volume based on the parameter; and
a third step of a volume allocation unit of the management apparatus creating the volume selected with the volume selection unit based on the parameter and allocating the created volume to the virtual storage unit allocated to the virtual server unit with the virtual storage allocation unit,
wherein, at the first step, the virtual storage search policy table is presented to the user for the user to select a search condition, the virtual storage unit is searched according to a conditional statement corresponding to the search condition, candidates of the virtual storage unit are presented together with the status of the virtual storage unit to the user for the user to select the virtual storage unit, and the virtual storage unit to be allocated to the virtual server unit is selected.

5. The volume allocation method according to claim 4, wherein, at the second step, a conditional statement that coincides with the conditional statement is searched among all conditional statements registered in the volume type-search policy table and candidates of the volume are presented to the user for the user to select the volume, and the type of the volume to be allocated to the virtual storage unit allocated to the virtual server unit is selected.

6. The volume allocation method according to claim 4, further comprising a fourth step of a policy table update unit of the management apparatus adding or updating the content of the virtual storage search policy table or the volume type search policy table.

7. A management apparatus for managing a storage apparatus including a volume for storing data sent from a client apparatus via a server apparatus, comprising:
a virtual storage selection unit for selecting a virtual storage unit as a virtualization of the storage apparatus to be allocated to a virtual server unit as a virtualization of the server apparatus according to a virtual storage search policy table for searching the virtual storage unit based on a parameter input by a user when a command is issued for allocating the volume to the virtual server unit;
a volume selection unit for selecting the type of the volume to be allocated to the virtual storage unit allocated to the virtual server unit with the virtual storage allocation unit according to a volume type search policy table for searching the type of the volume based on the parameter; and
a volume allocation unit for creating the volume selected with the volume selection unit based on the parameter and allocating the created volume to the virtual storage unit allocated to the virtual server unit with the virtual storage allocation unit,
wherein the virtual storage selection unit presents the virtual storage search policy table to the user for the user to select a search condition, searches for the virtual storage unit according to a conditional statement corresponding to the search condition, presents candidates of the virtual storage unit together with the status of the virtual storage unit to the user for the user to select the virtual storage unit, and selects the virtual storage unit to be allocated to the virtual server unit.

8. The management apparatus according to claim 7, wherein the volume selection unit searches for a conditional statement that coincides with the conditional statement among all conditional statements registered in the volume type search policy table and presents candidates of the volume to the user for the user to select the volume, and selects the type of the volume to be allocated to the virtual storage unit allocated to the virtual server unit.

9. The management apparatus according to claim 7, further comprising a policy table update unit for adding or updating the content of the virtual storage search policy table or the volume type search policy table.

* * * * *